United States Patent
Aylward et al.

(10) Patent No.: US 7,585,557 B2
(45) Date of Patent: Sep. 8, 2009

(54) FOAM CORE IMAGING ELEMENT WITH GRADIENT DENSITY CORE

(75) Inventors: Peter T. Aylward, Hilton, NY (US); Narasimharao Dontula, Rochester, NY (US); Terry A. Heath, Caledonia, NY (US); Richard D. Bomba, Rochester, NY (US); John E. Benson, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 926 days.

(21) Appl. No.: 10/780,263

(22) Filed: Feb. 17, 2004

(65) Prior Publication Data
US 2005/0181196 A1 Aug. 18, 2005

(51) Int. Cl.
*B41B 5/00* (2006.01)

(52) U.S. Cl. .............. 428/195.1; 428/304.4; 428/307.3; 428/309.9; 428/308.4; 428/311.51; 428/319.9; 430/138

(58) Field of Classification Search .............. 428/304.4, 428/307.3, 309.9, 308.4, 311.1, 311.51, 319.9; 430/138
See application file for complete search history.

(56) References Cited

U.S. PATENT DOCUMENTS

| | | |
|---|---|---|
| 3,299,192 A | 1/1967 | Lux |
| 3,864,444 A | 2/1975 | Johnson |
| 4,098,941 A | 7/1978 | Johnson |
| 4,209,188 A * | 6/1980 | Chao et al. .................. 503/215 |
| 4,440,846 A * | 4/1984 | Sanders et al. .............. 430/138 |
| 4,456,571 A | 6/1984 | Johnson |
| 4,764,420 A * | 8/1988 | Gluck et al. ............. 428/317.7 |
| 4,832,775 A | 5/1989 | Park et al. |
| 5,084,334 A | 1/1992 | Hamano et al. |
| 5,277,852 A | 1/1994 | Spydevold |
| 5,318,944 A * | 6/1994 | Sakai .......................... 503/227 |
| 5,667,740 A | 9/1997 | Spydevold |

(Continued)

FOREIGN PATENT DOCUMENTS

EP          1 285 741 A1    2/2003

(Continued)

OTHER PUBLICATIONS

EP01890228.8 application, filed Jul. 2, 2001, now publication EP1285741A1.

(Continued)

*Primary Examiner*—Bruce H Hess
*Assistant Examiner*—Tamra L Dicus

(57) ABSTRACT

The invention relates to a base comprising a closed cell foam core sheet having a closed cell foam layer with a density gradient between the center of the core and the surfaces of the core. The invention also relates to a method of making such a base by adding a first concentration of a first blowing agent to a first polymer to form a first mixture, adding a second concentration of a second blowing agent to a second polymer to form a second mixture, and extruding the mixtures to form the closed cell foam core sheet. The invention also relates to a method of making such a closed cell foam core sheet base comprising the steps of adding a blowing agent to a polymer to form a mixture, melting the mixture, extruding the mixture from a die, and rapidly quenching the mixture against a high heat transfer surface.

45 Claims, 1 Drawing Sheet

U.S. PATENT DOCUMENTS

| | | | |
|---|---|---|---|
| 5,674,442 A | | 10/1997 | Morita |
| 5,851,651 A | | 12/1998 | Chao |
| 5,866,282 A | | 2/1999 | Bourdelais et al. |
| 5,916,672 A | * | 6/1999 | Reeves et al. ............ 428/319.9 |
| 6,030,740 A | * | 2/2000 | Polykarpov ................ 430/138 |
| 6,077,065 A | | 6/2000 | Sumiyoshi et al. |
| 6,080,520 A | * | 6/2000 | Polykarpov et al. ......... 430/138 |
| 6,093,481 A | * | 7/2000 | Lynn et al. .................. 428/217 |
| 6,099,948 A | * | 8/2000 | Paver, Jr. ................. 428/304.4 |
| 6,127,084 A | * | 10/2000 | Katampe et al. ............ 430/138 |
| 6,342,329 B1 | * | 1/2002 | Tsuda ........................ 430/138 |
| 6,447,976 B1 | * | 9/2002 | Dontula et al. .............. 430/201 |
| 6,514,659 B1 | | 2/2003 | Dontula et al. |
| 6,514,660 B1 | | 2/2003 | Majumdar et al. |
| 6,537,656 B1 | * | 3/2003 | Dontula et al. ........... 428/314.4 |
| 6,566,033 B1 | | 5/2003 | Majumdar et al. |
| 6,627,018 B1 | * | 9/2003 | O'Neill et al. ................ 156/78 |
| 6,646,018 B2 | * | 11/2003 | Gabbard et al. ............... 521/57 |
| 6,656,671 B1 | * | 12/2003 | Aylward et al. ............. 430/531 |
| 6,864,023 B2 | * | 3/2005 | Aylward et al. ............... 430/15 |
| 6,872,673 B2 | * | 3/2005 | MacAulay ................... 442/152 |
| 6,876,467 B1 | * | 4/2005 | Yamaguchi ................ 358/1.9 |
| 2003/0031747 A1 | | 2/2003 | Becker |
| 2003/0031748 A1 | | 2/2003 | Becker |
| 2003/0036479 A1 | | 2/2003 | Majumdar et al. |
| 2003/0073577 A1 | | 4/2003 | Majumdar et al. |
| 2003/0118750 A1 | | 6/2003 | Bourdelais et al. |
| 2003/0123150 A1 | | 7/2003 | Brickey et al. |
| 2003/0128313 A1 | | 7/2003 | Kaminsky et al. |
| 2003/0152760 A1 | | 8/2003 | Lai et al. |
| 2003/0219663 A1 | | 11/2003 | Sunderrajan et al. |
| 2003/0232188 A1 | | 12/2003 | Savage et al. |
| 2004/0063005 A1 | * | 4/2004 | Aylward et al. ............... 430/12 |

FOREIGN PATENT DOCUMENTS

| | | |
|---|---|---|
| EP | 0 838 321 B1 | 12/2003 |
| WO | 99/12722 | 3/1999 |

OTHER PUBLICATIONS

Japanese Abstract JP2839905B2 derived from JP3062028 A.
Japanese Abstract JP04-327937.
Japanese Abstract JP08-132415.
Japanese Abstract JP09-106038.
Japanese Abstract JP09-127648.
Japanese Abstract JP10-249915.
Japanese Abstract JP11-023814.
Japanese Abstract JP3308733.

* cited by examiner

FOAM CORE IMAGING ELEMENT WITH GRADIENT DENSITY CORE

FIELD OF THE INVENTION

This invention relates to foam core supports for article, preferably an imaging elements.

BACKGROUND OF THE INVENTION

In order for a print imaging support to be widely accepted by the consumer for imaging applications, it has to meet requirements for preferred basis weight, caliper, stiffness, smoothness, gloss, whiteness, and opacity. Supports with properties outside the typical range for 'imaging media' suffer low consumer acceptance.

In addition to these fundamental requirements, imaging supports are also subject to other specific requirements depending upon the mode of image formation onto the support. For example, in the formation of photographic paper, it is important that the photographic paper be resistant to penetration by liquid processing chemicals without which a stain appears on the print border accompanied by a severe loss in image quality. In the formation of 'photo-quality' ink jet paper, it is important that the paper is readily wetted by ink and that it exhibits the ability to absorb high concentrations of ink and dry quickly. If the ink is not absorbed quickly, the elements block or stick together when stacked against subsequent prints and exhibit smudging and uneven print density. For thermal media, it is important that the support contain an insulative layer in order to maximize the transfer of dye from the donor to produce higher color saturation.

It is important, therefore, for an imaging media to simultaneously satisfy several requirements. One commonly used technique in the art for simultaneously satisfying multiple requirements is through the use of composite structures comprising multiple layers wherein each of the layers, either individually or synergistically, serves distinct functions. For example, it is known that a conventional photographic paper comprises a cellulose paper base that has applied thereto a layer of polyolefin resin, typically polyethylene, on each side, which serves to provide waterproofing to the paper and also provides a smooth surface on which the photosensitive layers are formed. In another imaging material, described in U.S. Pat. No. 5,866,282, biaxially oriented polyolefin sheets are extrusion laminated to cellulose paper to create a support for silver halide imaging layers. The biaxially oriented sheets described therein have a microvoided layer in combination with coextruded layers that contain white pigments, such as $TiC_2$, above and below the microvoided layer. The composite imaging support structure described has been found to be more durable, sharper, and brighter than prior art photographic paper imaging supports that use cast melt extruded polyethylene layers coated on cellulose paper. In U.S. Pat. No. 5,851,651, porous coatings comprising inorganic pigments and anionic, organic binders are blade coated to cellulose paper to create 'photo-quality' ink jet paper.

In all of the above imaging supports, multiple operations are required to manufacture and assemble all of the individual layers. For example, photographic paper typically requires a paper-making operation followed by a polyethylene extrusion coating operation, or as disclosed in U.S. Pat. No. 5,866,282, a paper-making operation is followed by a lamination operation for which the laminates are made in yet another extrusion casting operation. There is a need for imaging supports that can be manufactured in a single in-line manufacturing process while still meeting the stringent features and quality requirements of imaging bases.

It is also well known in the art that traditional imaging bases consist of raw paper base. For example, in typical photographic paper as currently made, approximately 75% of the weight of the photographic paper comprises the raw paper base. Although raw paper base is typically a high modulus, low cost material, there exist significant environmental issues with the paper manufacturing process. There is a need for alternate raw materials and manufacturing processes that are more environmentally friendly. Additionally to minimize environmental impact, it is important to reduce the raw paper base content, where possible, without sacrificing the imaging base features that are valued by the customer, i.e., strength, stiffness, and surface properties of the imaging support.

An important corollary of the above is the ability to recycle photographic paper. Current photographic papers cannot be recycled because they are composites of polyethylene and raw paper base and, as such, cannot be recycled using polymer recovery processes or paper recovery processes. A photographic paper that comprises significantly higher contents of polymer lends itself to recycling using polymer recovery processes.

Existing composite color paper structures are typically subject to curl through the manufacturing, finishing, and processing operations. This curl is primarily due to internal stresses that are built into the various layers of the composite structure during manufacturing and drying operations, as well as during storage operations (core-set curl). Additionally, since the different layers of the composite structure exhibit different susceptibility to humidity, the curl of the imaging base changes as a function of the humidity of its immediate environment. There is a need for an imaging support that minimizes curl sensitivity as a function of humidity, or ideally, does not exhibit curl sensitivity.

The stringent and varied requirements of imaging media, therefore, demand a constant evolution of material and processing technology. One such technology known in the art as 'polymer foams' has previously found significant application in food and drink containers, packaging, furniture, and appliances. Polymer foams have also been referred to as cellular polymers, foamed plastic, or expanded plastic. Polymer foams are multiple phase systems comprising a solid polymer matrix that is continuous and a gas phase. For example, U.S. Pat. No. 4,832,775 discloses a composite foam/film structure which comprises a polystyrene foam substrate, oriented polypropylene film applied to at least one major surface of the polystyrene foam substrate, and an acrylic adhesive component securing the polypropylene film to the major surface of the polystyrene foam substrate. The foregoing composite foam/film structure can be shaped by conventional processes, such as thermoforming, to provide numerous types of useful articles including cups, bowls, and plates, as well as cartons and containers that exhibit excellent levels of puncture, flex-crack, grease and abrasion resistance, moisture barrier properties, and resiliency.

Foams have also found limited application in imaging media. For example, JP 2839905 B2 discloses a 3-layer structure comprising a foamed polyolefin layer on the image-receiving side, raw paper base, and a polyethylene resin coat on the backside. The foamed resin layer was created by extruding a mixture of 20 weight % titanium dioxide master batch in low density polyethylene, 78 weight % polypropylene, and 2 weight % of Daiblow PE-M20 (AL)NK blowing agent through a T-die. This foamed sheet was then laminated to the paper base using a hot melt adhesive. The disclosure JP 09127648 A highlights a variation of the JP 2839905 B2 structure, in which the resin on the backside of the paper base is foamed, while the image receiving side resin layer is unfoamed. Another variation is a 4-layer structure highlighted in JP 09106038 A. In this, the image receiving resin layer comprises 2 layers, an unfoamed resin layer, which is in contact with the emulsion, and a foamed resin layer, which is adhered to the paper base. There are several problems with this, however. Structures described in the foregoing patents need to use foamed layers as thin as 10 μm to 45 μm, since the foamed resin layers are being used to replace existing resin coated layers to the paper base. The thickness restriction is further needed to maintain the structural integrity of the photographic paper base since the raw paper base is providing the stiffness. It is known by those versed in the art of foaming that it is very difficult to make thin uniform foamed films with substantial reduction in density especially in the thickness range noted above.

A further requirement for a reflective support is to provide a white or near white appearance, as well as an opaque platform for the imaging layer. A white background is necessary to provide the highlight areas of the image. An opaque layer is needed to maximize the scattering of the light and prevent show through.

Traditional photographic prints, as well as ink jet, thermal and all other reflective imaging methods employ a small number or set of subtractive color pigments, dyes, or colorants which, when used by themselves or in any combination, can result in the entire gamut of color sensation. When all of these are present at their maximum in the imaging layer of the support, the observer sees a black appearance. When they are used in uneven ratios, any color in color space can be reproduced for the observer. When they are all absent from the imaging layer of the support and one is looking through that layer to the support below, a white appearance is seen by the observer. Therefore, the reflective image can only be as white and as bright as is the support layer below. Great pains are taken in the selection of materials, their concentration, combination and/or placement in a reflective imaging support so that the appearance of whiteness can be maximized.

Since the perception of whiteness varies between observers, colorants are added to the reflective imaging support, as needed. In general, studies have shown that most observers prefer a slightly blue white as opposed to a true white or slightly yellow white and, hence, the inclusion of colorants that result in a slight blue hue to the imaging support member. (Principles of Color Technology, Billmeyer and Saltzman, $2^{nd}$ edition, John Wiley & Sons, New York, 1981, p. 66).

The same considerations of materials selection, combination, concentration, and placement also hold true when one is concerned with the opacity of a reflective support. One wishes to prevent the show through of the reflective image below the one being viewed in a stack of images or the non-white surface that the reflective image is resting on or is mounted to by providing adequate opacity. In the case of resin coated photographic prints, the layer immediately below the emulsion has a large impact on the image sharpness of the print due to the scattering of light during exposure of the print paper to the negative (To RC or Not to RC, Crawford, Gray and Parsons, Journal of Applied Photographic Engineering, 110-117 (1979)). Large amounts of $TiO_2$, in the 10 to 15 percent range or higher, are added to this layer to enhance image sharpness and, in turn, hiding power and opacity of the imaging support. Given the fact that ink jet, thermal, and most high-end imaging media were derived from and are now in competition with photographic imaging media, the need for comparable degrees of opacity becomes necessary.

In is further known in the art to provide a voided polyester film with a non-continuous voided core density for use in labels. U.S. Pat. No 5,084,334 discloses a void containing polyester film using non-compatible blends of polyester resins in which voids are formed around fine particles. In order to create voids, the sheet is drawn in both the machine and cross machine directions. This film requires the dispersion of particles sizes in a manner that provides a concentration of finer particle near the surfaces and a larger particle size near the central part of the polyester core in order to provide a different amount of voiding when biaxially stretched at the surface as opposed to the core. It should be noted that this is material depends on a particle to provide voiding.

In is also known in the art to make polystyrene foam with a high-density skin layer. Johnson et al in U.S. Pat. Nos. 4,456,571 and 4,098,941 discloses polystyrene foam that is extruded upwardly as a tube into a cooling media of boiling water, both the interior and exterior surfaces of the cylindrically shaped extrudate passing through a bath of boiling water of variable depth. The polystyrene foam extrudate produced by such a method has a high density at the interior and exterior surfaces, with the density progressively decreasing from these surfaces toward the center core of the extrudate. U.S. Pat. Nos. 4,456,571 and 4,098,941 also disclose a method and apparatus for producing a foamed polymeric sheet having comparatively high-density skin layers. Molten polymer containing a foaming agent is extruded from a die into a post-extrusion region defined by the die and a spaced pair of rotating chill rolls, which are spaced from the die. The post-extrusion region is maintained at a pressure sufficient to at least inhibit expansion of the foamable molten polymer through the use of cooled sealing elements, which occupy a substantial portion of the space between the die and the chill rolls, and are spaced from the chill rolls. The rolls and the sealing elements are cooled so that foamable molten polymer in the space between the sealing elements and the rolls becomes solidified, completing the seal. The chill rolls are maintained at a temperature below the temperature of the molten polymer to aid the skin formation on the surfaces of the polymer. If desired, the polymer can pass directly from the chill rolls into a water bath. It would be desirable to have a stiff foamed polyolefins, specifically polypropylene, sheets or films that have a gradient or variable density from the center of the core to the surface without having to provide a skin layer.

It is known to produce polystyrene foam structures that have a comparatively low core density in relation to comparatively high skin layer densities. See, for example, U.S. Pat. Nos. 3,864,444 and 3,299,192.

U.S. Pat. No. 3,299,192 states that the rigidity, liquid handling, and thermal insulation capability of foamed plastic pipe is enhanced by quench chilling the internal and external walls of a tube within a short time after it emerges from an extrusion die. The patent notes that such chilling produces an impervious and non-porous internal and external skin on the pipe. The present invention provides an imaging media comprising a foam core with increasing density from the center to the outer surfaces which is then coated with polymer flange layers or laminated with polymer flange layers.

U.S. Pat. No 6,077,065 describes a process for making non-foamed smooth surfaced solid plastic films. Such a device helps to minimize air pockets by providing a compliant roller. While this process provides improvements in the area of solid films such a process does not yield foam films of sufficient smoothness for imaging purposes. It would be desirable to make smoother surface foamed film.

U.S. Pat. No. 5,674,442 provides a solid film with improved optical properties such as gloss by extruding a melt polymer into a nip formed by a chill roller and an endless moving belt. While such a device is useful in making smooth surfaced solid films on both sides simultaneously, utility in making a smooth surface foamed film with control of the foam void size is very limited. It would be desirable to have a process that can form a smooth surface for imaging purposes while controlling the foam void formation to provide a uniform density.

Other patents that address foaming also includes U.S. Pat. No. 5,277,852 for making foamed PVC blown films with a post extrusion pressure zone and U.S. Pat. No. 5,667,740 for making lightweight cellular foamed PVC molded materials. While these processes are useful in their own right, they are not suitable for making imaging materials from foamed polyolefins, specifically polypropylenes.

U.S. Pat. No. 6,514,659 discloses a means of making a foam core for imaging applications that has a smooth surface. In this approach the smoothness of the overall article, preferably an imaging element, is achieved via thickness and modulus of the core and the flange layers. While this approach is useful and provides a smooth imaging element it is very costly and the production rates are slow and difficult to maintain because of flange layer thickness. It would be desirable to make a superior foam core with smooth surface that requires less polymer flange thickness. U.S. Pat. Nos. 6,566,033, 6,537,656, 6,447,976 and U.S. patent applications 20030219663A1, 20030152760A1 also describe foam core elements for use in imaging applications, but do not discuss the use of density gradients.

SUMMARY OF THE INVENTION

The present invention relates to an article comprising a base wherein the base comprises a closed cell foam core sheet having at least one closed cell foam layer, wherein the foam has been created by expanding a polymer through the use of a blowing agent, and wherein the closed cell foam core sheet has a density gradient between the center of the core and the surfaces of the core. The invention also relates to a method of making a base for an imaging member, wherein the base comprises a closed cell foam core sheet that is made from a polymer that has been expanded through the use of a blowing agent, and wherein the closed cell foam core sheet has a density wherein the density comprises a gradient, comprising the steps of adding a first concentration of a first blowing agent to a first polymer to form a first mixture, adding a second concentration of a second blowing agent to a second polymer to form a second mixture, and extruding the first and second mixtures to form the closed cell foam core sheet. The invention also relates to a method of making a closed cell foam core sheet base for an imaging member wherein the foam core sheet has a density gradient, comprising the steps of adding a blowing agent to a polymer to form a mixture, melting the mixture, extruding the mixture from a die, and rapidly quenching the mixture against a high heat transfer surface, which can be temperature controlled.

ADVANTAGEOUS EFFECT OF THE INVENTION

This invention has numerous advantages, not all of which are incorporated into a single embodiment. This invention provides a superior support sheet. Specifically, it provides a support sheet of high stiffness, excellent smoothness, high opacity, whiteness, and excellent humidity curl resistance. It also provides a support sheet that can be manufactured using a single in-line operation. It also provides a support that can be effectively recycled. The support can be manufactured in a single in-line operation. This significantly lowers element manufacturing costs and would eliminate disadvantages in the manufacturing of the current generation of support sheets including very tight moisture specifications in the raw base and specifications to minimize pits during resin coating. It is an objective of this invention to use foam at the core of the imaging base, with high modulus flange layers that provide the needed stiffness surrounding the foam core on either side. Using this approach, many new features of the imaging base may be exploited, and restrictions in manufacturing eliminated. These and other advantages will be apparent from the detailed description below.

DETAILED DESCRIPTION OF THE INVENTION

Figure 1:
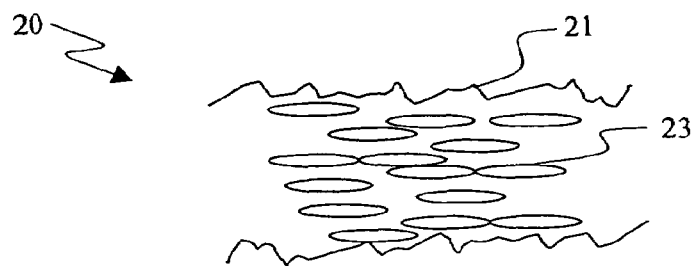
FIG. 1 is a cross section of a foam core showing somewhat uniform density throughout the thickness of the core sheet

The present invention relates to an article, preferably an imaging element, comprising a base of closed cell foam. The closed cell foam core sheet has at least one closed cell foam core layer, that is, central layer, of a polymer that has been expanded through the use of a blowing agent, and with a gradient or variable density from the center of the layer to the outer surfaces of the layer. In addition, the present invention relates to a method of making the base described above by first adding a concentration of blowing agent to a polymer to form a mixture, then adding a second blowing agent to a second polymer to form a second mixture, and extruding the first and second mixtures to form a closed cell foam core sheet with a gradient or variable density. The gradient foam core may also be made by adding a blowing agent to a polymer to form a mixture, and rapidly quenching the mixture against a high heat transfer surface, which can be temperature controlled, for example, a cold surface. In addition, the present invention teaches a method to manufacture a closed cell foam with a smooth surface. Furthermore this method teaches a technique to use low melt strength polymers or polymer compositions to create closed cell foams.

The terms as used herein, "top", "upper", "emulsion side", and "face" mean the side or toward the side of the element carrying the imaging layer(s). The terms "bottom", "lower side" and "back" mean the side opposite of the imaging layer or layers.

The article, preferably an imaging element, of the invention comprises a base of polymer foam core. The base may have optional upper and lower flange sheets adhered thereto. The polymer foam core comprises a homopolymer such as a polyolefin, polystyrene, polyvinylchloride or other typical thermoplastic polymers, their copolymers or their blends thereof, or other polymeric systems like polyurethanes, polyisocyanurates that has been expanded through the use of a blowing agent to consist of two phases, a solid polymer matrix, and a gaseous phase.

Polyolefins are preferred because they are easily foamed and provide the good stiffness required for imaging members. The polymers useful in providing a foam core may comprise a homopolymer of polypropylene or blends of homopolymers, or blends of homopolymer with random copolymers of polypropylene or any other polyolefins like high melt strength polypropylenes or polyethylenes with melt flow rates (MFR) of from 0.3 to 30 MFR, more preferably with melt flow rates of 0.3 to 20 and most preferably 0.3 to 15. Melt flow rate characterization is similar to the melt index test (ASTM D 1238, ISO 1133). This test characterizes the number of grams of polymer extruded by a piston being pushed by a weight on top of it through a melt index tester in a time period of 10 minutes. The melt flow rate test for polypropylenes is carried out at 230° C. under a load of 2.16 kg. Furthermore, the polypropylene homopolymers may be isotactic, syndiotactic or atactic or long chain branched.

In order to control cellular structure during foaming and preferably manufacturing a closed cell foam, it may be useful to quantify the resistance offered by the resin during foaming. One method to quantify the resistance offered by resin during a stretching process, which occurs when cells are growing in a foam process, is the melt strength or the melt tension test. This test is typically carried out using an apparatus like the RHEOTENS melt tension apparatus provided by Gottfert. Melt tension or melt strength of the resin is determined by stretching a strand of polymer extruded out of a die between two counter-rotating wheels. The frequency of rotation of the wheels is increased by a preset acceleration and this results in the polymer strand being stretched. The pulling force measured in centinewtons (cN) during the stretching process is continuously recorded until the polymer strand breaks. The maximum force obtained before break of the strand is known as melt tension or melt strength of the polymer at the particular temperature. The foregoing procedure may be performed as described by M. B. Bradley and E. M. Phillips in the Society of Plastics engineers ANTEC 1990 conference paper (page 718). Homopolymers of polypropylenes typically have low melt strength. In order to enhance the melt strength of the polypropylene resin, resin manufacturers have used multiple strategies, such as cross-linking by irradiation or by the addition of chemical crosslinkers, which results in branching, as discussed in U.S. Pat. Nos. 4,714,716 and 5,527,573, chemical treatment with coupling or branching agents, as described in WO-99/10424, or increasing the molecular weight of the resin. There are a variety of useful commercially available high melt strength polypropylenes, such as Basell PF 623, Basell PF814, Dow D114, Chisso FS9000 and a Borealis grade Daploy™ WB130HMS. High melt strength polypropylenes are typically characterized with a melt strength or melt tension, which is equal to greater than 20 cN at 200° C. Low melt strength polypropylenes are defined here as resins having melt strength or melt tension less than 20 cN at 200° C., more preferably less than 10 cN. Blends of low melt strength polypropylenes and high melt strength polypropylenes or any other high melt strength polyolefin which has melt strength or melt tension of greater than 20 cN at 200° C. are useful to provide sufficient melt properties to optimize the final polymer properties that will impact the end product, as well as the properties that will impact the process conditions for making the foam. Useful weight percent ranges of low melt strength resins to high melt strength resins may be 100/0 to 0/100 more preferably 100/0 to 65/35. Most polypropylenes may be used with the useful melt flow rate range discussed above. In an additional embodiment the preferred polymer is polyester. Polyesters provide exceptional stiffness properties for their weight.

The article, preferably an imaging element, of this invention has a polymeric foam core in which there is a foam density gradient that produces a core layer that is smoother on the top and bottom surfaces than in the center, as compared to commercially available foam cores. The article, preferably an imaging element, contains at least one closed cell foam core layer, where one of the foam layers has a polymer that has been expanded through the use of a blowing agent and a density gradient has been formed. In a preferred embodiment the closed cell foam core sheet has a center and at least one surface where the density increases from the center to the surface. Such a closed cell foam core sheet provides a smoother surface for the flange layers that are optionally applied to it. Additionally, having different, preferably higher, density on the outer surface provides an I-beam effect in which there is greater bending resistances than a foam core sheet with a uniform density gradient through the foam layer.

As a point of reference, FIG. 1 is a cross section of a conventional foam core sheet 20 that has a somewhat rough surface 21 and also has a somewhat uniform level of density formed by multiple air bubbles 23 that are uniformity dispersed from the center of the core to the outer surfaces. The relatively low densities at or near the surface create a rough surface. Such a rough surface is generally not desirable for imaging applications because it may create craters and pits even if it is over coated with a polymer flange layer.

Figure 2:
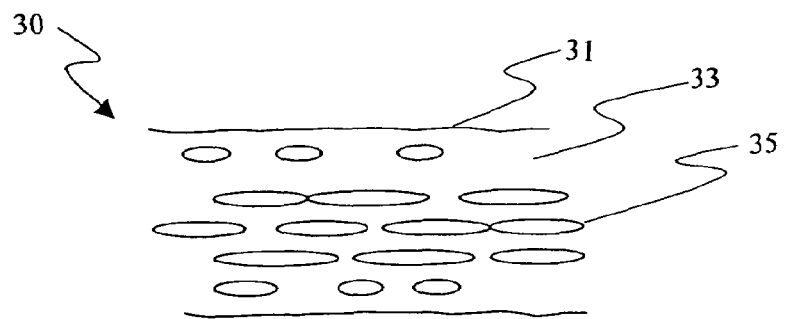
FIG. 2 is a cross section of a foam core showing lower density at the core than near the surface regions.

Furthermore, the overall gloss, and uniformity of appearance of the article, preferably an imaging element, is reduced. FIG. 2 is a cross section of a foam core sheet in which there is a non-uniform distribution of densities from the center to the outer surface. As depicted, the formation of high density regions near the surface helps to provide a smoother surface and also provides for a stiffer foam core. Stiffer foam cores help to provide an imaging print that feels substantial and also helps to resist curl. Furthermore for equivalent stiffness, article, preferably an imaging element,s created from foam cores which have a density gradient can be thinner, and, as a result, more linear footage can be wound on a roll for a given roll diameter and a larger number of imaging elements can fit in a customer's package.

Figure 3:
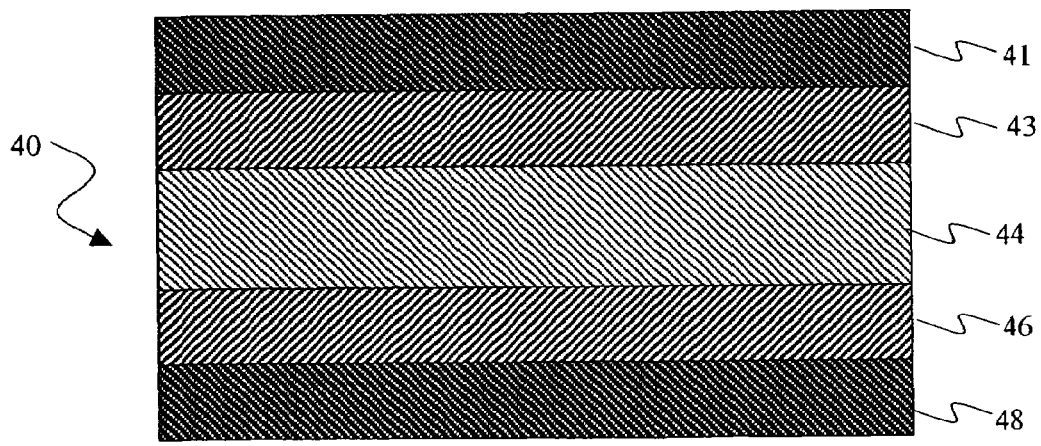
FIG. 3 is a cross section of a gradient density foam core sheet with a multiplicity of layers.

In an additional embodiment of this invention the closed cell foam core sheet comprises at least two closed cell foam layers where at least two foam layers comprises different densities to form a gradient. In a further embodiment, the article, preferably an imaging element, has a closed cell foam core sheet that comprises at least three closed cell foam layers. In this embodiment at least one of the three foam layers is between the other foam layers and has a lower density than the foam layers on either side. An additional means of forming a stiff foam core is to have more than one layer in which there are different concentrations of blowing agents. In other embodiments, the blowing agents and their relative concentrations may be the same or different and the polymers making up the layers may be the same or different, so long as the combinations produce a density gradient. FIG. 3 is a cross section of a foam core sheet 40 with a central foam core layer 44 that has a low density and upper foam density layer 43 at a different density than the core and a lower foam density layer 46. On top of foam density layer 43 is an upper flange layer 41 that has a different density than foam layer 43. A lower flange layer 48 is adjacent to lower foam density layer 46.

In an additional embodiment of this invention, the closed cell foam core sheet has a center and at least one surface wherein the density decreases from the center to the surface. Such an article, preferably an imaging element, provides some degree of cushioning and thermal holdout. This helps to minimize silver halide emulsion pressure sensitivity and improves temperature performance for thermal dye transfer imaging media. Such a base has better dye transfer efficiency, because the temperature tends to concentrate on the surface and provides more dye transfer from a donor web.

The foaming of these polymers may be carried out through several mechanical, chemical, or physical means. Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents, generating gases such as nitrogen or carbon dioxide by the application of heat, or through exothermic heat of reaction during polymerization. Physical methods include such techniques as the expansion of a gas dissolved in a polymer mass upon reduction of system pressure, the volatilization of low-boiling liquids such as fluorocarbons or methylene chloride, or the incorporation of hollow microspheres in a polymer matrix. The choice of foaming technique is dictated by desired foam density reduction, desired properties, and manufacturing process. Preferred physical blowing agent may include $CO_2$, $N_2$, argon, hydrocarbon, water or mixtures thereof, as these offer a low cost and environmentally friendly means of achieving foam in a polymer system, but other gases could potentially be used as well.

In a preferred embodiment of this invention, polyolefins, such as polyethylene and polypropylene, their blends and their copolymers are used as the matrix polymer in the foam core along with a chemical blowing agent such as sodium bicarbonate, citric acid, organic acid salts, azodicarbonamide, azobisformamide, azobisisobutyrolnitrile, diazoaminobenzene, 4,4'-oxybis(benzene sulfonyl hydrazide) (OBSH), N,N'-dinitrosopentamethyltetramine (DNPA), sodium borohydride, and other blowing agent agents well known in the art and combinations thereof. The preferred chemical blowing agents would be sodium bicarbonate, citric acid, sodium bicarbonate/citric acid mixtures, citrate esters or mixtures with sodium bicarbonate, and azodicarbonamide. Endothermic blowing agents are preferred because they are non-yellowing which is useful for imaging and even synthetic paper applications.

If necessary, these foaming agents may be used together with an auxiliary foaming agent, nucleating agent, and a cross-linking agent. To enhance the formation of foam, a nucleating agent may be added to the first or second polymer. Typically the nucleating agent may be added at less than 3% by weight of the first or second polymer. Nucleating agents useful in this method may comprise an inorganic particle. In particular, talc has been found to provide good nucleating properties. It is desirable to have particles having a diameter of less than 10 μm. In a preferred embodiment of this method of formation of the imaging base is to have particles having a diameter of from 0.1 to 3 μm. Particles less than 0.1 μm tend to have limited nucleating properties while particles larger than 3 μm form larger areas of foam that cause non-uniform densities in the form core. Large non-uniforms areas are less desirable because they can cause unwanted surface roughness or pits in the surface.

The foam structure of a chemically blown foam is produced by the decomposition of the chemical blowing agent. The gas dissolves in the molten polymer because of the high pressure in the extruder. It is desirable to optimize the foam nucleation at the point of exiting the die. The drop in pressure causes the gas to become super-saturated. This results in nucleation of bubbles followed by bubble growth. Once the polymer is chilled rapidly, the foam bubbles freeze into the polymer as its viscosity increases. This technique is sensitive to processing conditions within the extruder, as well as the rheological properties of the polymer. The most preferable means is to combine the chemical blowing agent within a polymer in combination with coextrusion of other layers to provide enhanced adhesion of the photographic or imaging layer to the top most polymer layer.

Furthermore layers of polymer may also be coextruded that comprise pigment, tinting or optical brightening materials. The addition of these materials is useful in providing an element that has optimal whiteness, sharpness and opacity. It may also be desirable to add processing aid to enhance the foaming process as well as the compatibility of the other polymer layers during extrusion. Materials such as antioxidants, slip agents, filler, ultraviolet screening and other may be necessary. Other solid phases may be present in the foams in the form of fillers that are of organic (polymeric, fibrous) or inorganic (glass, ceramic, metal) origin. The fillers may be used for physical, optical (lightness, whiteness, and opacity), chemical, or processing property enhancements of the foam.

The suitable range in caliper (thickness) of an article made with a polymeric foam core may be between 25 and 1000 μm. Such article may further comprises a foam core with at least one flange layer attached thereto. Such an article may be used for a variety of application such as packaging, printing media for labels, packages, printing paper, synthetic paper and imaging elements. Typically for imaging elements and in particular photographic imaging elements the overall thickness of the base should be constrained to between 100 and 400 μm. Imaging elements below 100 μm, while achievable, are low in stiffness and are less desirable from a customer standpoint while bases above 400 μm are very stiff and have problems transporting through various photofinishing equipment. Since the preferred imaging element base useful in this invention has a foam core and at least one flange, it is desirable to have a foam core with a thickness of from 25 μm to 300 μm. The preferred caliper (thickness) range is from 50 μm to 200 μm because of the preferred overall caliper (thickness) range of the element, which lies from 100 μm to 400 μm. The preferred modulus of the foam core of the invention ranges from 30 MPa to 1000 MPa. In each case, the above range is preferred because of (a) consumer preference, (b) manufacturability, and (c) materials selection. It is noted that the final choice of flange and core materials, modulus, and caliper (thickness) will be a subject of the target overall element stiffness and caliper (thickness). Flange layers are particularly useful when the properties of the foam core alone are not sufficient to meet the requirements of a conventional paper-based imaging element. The range in density reduction of the foam core is from 20% to 95%. The preferred range in density reduction is from 40% to 70%. This is because it is difficult to manufacture a uniform product with very high density reduction (over 70%). Density reduction in percentage is the ratio of the difference between solid polymer and a particular foam sample to the solid polymer multiplied by 100. It is also not economical to manufacture a product with density reduction less than 40%. The foam core layer of the imaging element of this invention has a surface smoothness from 0.5 to 2 μm, while the final imaging element has a roughness average of between 0.1 to 1.4 μm. In one preferred embodiment, a cast sheet has a cast quenched roughness of from 0.1 to 2.0 μm.

One method of forming a density gradient foam core with a surface smoothness of less than 1.4 μm is to make a base with a closed cell foam core sheet with at least one closed cell foam layers in which the polymer of the closed cell foam core sheet is expanded through the use of a blowing agent. A density gradient polymeric foam with the desired smoothness may be formed by providing a closed cell form core layer of a first concentration of blowing agent with the first polymer to form a first mixture and a second concentration of a second blowing agent to a second polymer to form a second mixture and then extruding the first and second mixtures to form a closed cell foam core. In this embodiment the first and second concentration may be the same. Additionally the first blowing agent may be the same as the second blowing agent. In an additional embodiment the first polymer may be the same as the second polymer. The blowing agent is preferably a chemical blowing agent, an endothermic blowing agent, an exothermic blowing agent or combinations thereof. Useful exothermic blowing agents in this method may contain azodicarbonamide and its derivatives.

In another method for the formation of an article, preferably an imaging element, with a stiff polymeric foam core with a surface smoothness whose roughness average ($R_a$) is less than 2.0 μm, the base comprises a closed cell foam core sheet with a gradient density in which a blowing agent is added to a polymer to form a mixture, the mixture is melted and extruded from a die and rapidly quenched against a cold surface. The blowing agent may preferably be a chemical blowing agent or a physical blowing agent.

In one method of formation of an article, preferably an imaging element, the quenching is against a high heat transfer surface, which can be temperature controlled. A high heat transfer surface, which can be temperature controlled, is characterized by a heat transfer coefficient, which is greater than 113 $W/m^{2\circ}$ C. or more preferably greater or equal to 850 $W/m^{2\circ}$ C. It may be a cold metal surface. In a preferred embodiment, the surface temperature is less than the temperature of the extrudate, preferably less than 60° C., and more preferably less than 45° C. In further embodiments, the cold metal surface is a calendar roll or a moving metal belt that has been cooled. Additionally the cold surface may be water. High heat transfer coefficients can also be obtained due to phase change occurring at the interface or close to the interface of the foamed sheet and the high heat transfer surface, which can be temperature controlled. Furthermore, to get full benefits of the invention, the foamed sheet should be exposed for a suitable length of time to the high heat transfer surface, which can be temperature controlled. The amount of exposure time to the high heat transfer surface should be greater than or equal to 0.1 seconds. Also, the time spent by the extrudate (t measured in units of time, typically seconds) after it exits the die lip and prior to its contacting the high heat transfer surface needs to be controlled. This time may be expressed as a dimensionless time t*. This dimensionless time t*, which has no physical units, may be defined as the ratio of the product of diffusivity of the gas (D, has units of $m^2/sec$) and the process time t (units are seconds), to the square of half the extrudate thickness (($l/2)^2$, units are $m^2$) or it can be represented as $t^*=Dt/(l/2)^2$. This, t* is preferably less than 0.07, more preferably less than 0.05, and most preferably less than 0.04.

In the formation of an article, preferably an imaging element, of this invention the foam core may be cast extruded against a roller surface such as a chill roller or calender roll or flat surface such as a belt surface. Typically it is desirable to provide a surface that will quickly quench the melt polymer to form a region of high density at the surface or surfaces of the cast sheet. The growth of the foam bubble will be impacted by the rate of quenching, the selection of polymers and the control of the polymer melt strength prior to the bubble formation and during the growth of bubbles in the solidifying sheet. The formed cast sheet may then either be coated or treated with various functionality such as surface treatment for improved adhesion for other coating layers, it may be corona or plasma treated to enhance adhesion. The cast foam sheet may alternatively be stretched in at least one direction to change its physical properties or optical properties. After stretching, additional functionality may be applied to the foam core sheet. This may include indicia, stiffening layers, or layers that modify or enhance the optical functionality of the article, preferably an imaging element.

The optional flange sheets of this invention are chosen to satisfy specific requirements of flexural modulus, caliper (thickness), surface roughness, and optical properties such as colorimetry and opacity. The flange members may be formed integrally with the foam core by manufacturing the foam core with a flange skin sheet or the flange may be laminated to the foam core material. The integral extrusion of flange members with the core is preferred for cost. The lamination technique allows a wider range of properties and materials to be used for the flange skin materials.

Imaging elements are constrained to a range in stiffness and caliper (thickness). At stiffness below a certain minimum stiffness, there is a problem with the element in print stackability and print conveyance during transport through photofinishing equipment, particularly high-speed photoprocessors. It is believed that there is a minimum cross direction stiffness of 60 mN required for effective transport through photofinishing equipment. At stiffness above a certain maximum, there is a problem with the element in cutting, punching, slitting, and chopping during transport through photofinishing equipment. It is believed that there is a maximum machine direction stiffness of 300 mN for effective transport through photofinishing equipment. It is also important for the same transport reasons through photofinishing equipment that the caliper (thickness) of the imaging element be constrained from 100 μm to 400 μm.

Imaging elements are typically constrained by consumer performance and processing machine restrictions to a stiffness range of from 100 mN to 250 mN, although stiffness values as low as 50 mN may occasionally be useful, and a caliper (thickness) range of from 100 μm to 400 μm. In the design of the member of the invention, there exists a relationship between stiffness of the imaging element and the caliper (thickness) and modulus of the foam core and modulus of the flange sheets, i.e., for a given core thickness, the stiffness of the element can be altered by changing the caliper (thickness) of the flange elements and/or changing the modulus of the flange elements and/or changing the modulus of the foam core.

If the target overall stiffness and caliper (thickness) of the article, preferably an imaging element, are specified, then, for a given core thickness and core material, the target caliper (thickness) and modulus of the flange elements are implicitly constrained. Conversely, given a target stiffness and caliper (thickness) of the article, preferably an imaging element, for a given caliper (thickness) and modulus of the flange sheets, the core thickness and core modulus are implicitly constrained.

The flange thickness useful in this invention may vary to provided required stiffness, opacity, smoothness, durability, printability or other functionality that is dependant on the end application. The preferred caliper (thickness) of the flange sheets of the invention ranges from 10 μm to 175 μm, preferably from 25 μm to 70 μm, and the modulus of the flange sheets of the invention ranges from 700 MPa to 10500 MPa. In each case, the above range is preferred because of (a) consumer preference, (b) manufacturability, and (c) materials selection. It is noted that the final choice of flange and core materials, modulus, and caliper (thickness) will be a subject of the target overall element stiffness and caliper (thickness).

The selection of core material, the extent of density reduction (foaming), and the use of any additives/treatments for, e.g., cross-linking the foam, determine the foam core modulus. The selection of flange materials and treatments (for example, the addition of strength agents for paper base or the use of filler materials for polymeric flange materials) determines the flange modulus.

The caliper (thickness) of the paper and of the high modulus polymeric material is determined by the respective flexural modulus such that the overall stiffness of the article, preferably an imaging element, lies within the preferred range, and the bending moment around the central axis is balanced to prevent excessive curl.

For example, at the low end of target stiffness (50 mN) for an imaging element and caliper (thickness) (100 µm), given a typical polyolefin foam of caliper (thickness) 50 µm and modulus 137.9 MPa, the flange sheet caliper (thickness) is then constrained to 25 µm on each side of the core, and the flange modulus required is 10343 MPa, properties that can be met using a high modulus paper base. Also, for example, at the high end of target stiffness (250 mN) and caliper (thickness) (400 µm), given a typical polyolefin foam of caliper (thickness) 300 µm and modulus 137.9 MPa, the flange sheet caliper (thickness) is constrained to 50 µm on each side and the flange modulus required is 1034 MPa, properties that can be met using a polyolefin flange sheet.

In other preferred lamination embodiments of this invention, the flange sheets used comprise paper or fabric. The paper of this invention can be made on a standard continuous fourdrinier wire machine or on other modern paper formers. Any pulps known in the art to provide paper may be used in this invention. Bleached hardwood chemical kraft pulp is preferred, as it provides brightness, a good starting surface, and good formation while maintaining strength. Paper flange sheets useful to this invention are of caliper (thickness) from 25 µm to 100 µm, preferably from 30 µm to 70 µm, so that the overall element thickness is in the range preferred by customers for imaging elements and processes in existing equipment. Paper flanges must be "smooth" as to not interfere with the viewing of images. Chemical additives to impart hydrophobicity (sizing), wet strength, and dry strength may be used as needed. Inorganic filler materials such as $TiO_2$, talc, $CaCO_3$, and clays may be used to enhance optical properties and reduce cost as needed. Dyes, biocides, processing or chemicals may also be used as needed. The paper may also be subject to smoothing operations such as dry or wet calendering, as well as to coating through an in-line or an off-line paper coater. When fabric is used as a flange, a unique article, preferably an imaging element, is formed that provides images with a cloth like texture.

In another preferred lamination embodiment of this invention, the flange sheets used comprise high modulus polyolefin polymers, such as high density polyethylene, polypropylene, or polystyrene, their blends or their copolymers, that may also have been stretched and oriented. They may be filled with suitable filler materials as to increase the modulus of the polymer and enhance other properties such as opacity, colorimetery and smoothness. Some of the commonly used inorganic filler materials are talc, clays, calcium carbonate, magnesium carbonate, barium sulfate, mica, aluminum hydroxide (trihydrate), wollastonite, glass fibers and spheres, silica, various silicates, and carbon black. Some of the organic fillers used are wood flour, jute fibers, sisal fibers, and polyester fibers. The preferred fillers are talc, mica, and calcium carbonate because they provide excellent modulus enhancing properties. Additional antioxidant and other thermal and light stabilizers may be added to the foam core and/or the flange layers to minimize thermal degradation of the polymers during processing and to minimize changes in the color of the base with time or exposure to light or dark keeping conditions.

In one embodiment, the article, preferably an imaging element, has at least one flange sheet adhered to the closed cell foam core sheet. In order to provide dimensional balance to the article, preferably an imaging element, it may be desirable to have a flange sheet on each side of the closed cell foam core sheet. The flange sheets may be integral with the form core sheet or they be applied to the foam sheet after it has been formed. In another embodiment of this invention, the flange sheets used comprise paper on one side and a high modulus polymeric material on the other side. Tints, whitening agents and optical brighteners may be added to the flange and or core layer of the article, preferably an imaging elements of this invention. To minimize the use of the tints, optical brighteners and whitening agents, it may be desirable to have them located in the upper flange sheet. This is desirable because they are closer to the image and provide the most benefit in that location.

In may also be desirable to have the base of this invention provided with an outer layer of polyethylene. Polyethylene may be on either the upper most layer of the base prior to applying and image forming layer or the bottom most layer of the base prior to coating any antistatic or friction control layers. Polyethylene is most desirable when gelatin based imaging layers are applied. The polyethylene provides a good surface that provides excellent adhesion. The polyethylene layer may be treated with a corona that allows aqueous materials to better wet the surface. It should be noted that polymers other than polyethylene may be used when the imaging layer binders are non-gelatin based. A primer layer may also be applied over the upper most polymer layer of the topside flange to improve the wettability and adhesion of the image layers.

The preferred caliper (thickness) of the base for use in imaging elements is from 100 µm to 400 µm. Bases less than 100 µm tend to flimsy while base greater than 400 µm are more difficult to handle because of their high stiffness. Polymeric foam core in combination with filled flange sheets on at least one side provides excellent opacity for articles, preferably an imaging elements. The articles, preferably an imaging elements of this invention have opacity greater than 90%. Members with opacity less than 90% have greater show through and may detract from viewing enjoyment. In one preferred embodiment, the imaging member has a b* UVO blueness of less than 3.50. Blueness values greater than 3.50 tend to be very blue appearing and may interfere with the true color of the image. The overall lightness (L*) of the imaging member should be from 90.0 to 97.0 to provide good image viewing pleasure.

In addition to the stiffness and caliper, an imaging element needs to meet constraints in surface smoothness. Surface smoothness characteristics may be met during flange-sheet manufacturing operations such as during papermaking or during the manufacture of oriented polymers like oriented polystyrene. Alternatively, it may be met by extrusion coating additional layer(s) of polymers such as polyethylene onto the flange sheets in contact with a textured chill-roll or similar technique known by those skilled in the art.

Optical properties such as opacity and colorimetry may be met by the appropriate use of filler materials such as titanium dioxide and calcium carbonate and colorants, tints, dyes and/or optical brighteners or other additives known to those skilled in the art. The fillers may be in the flange or an overcoat layer, such as polyethylene. Generally, base materials for color print imaging materials are white, possibly with a blue tint, as a slight blue is preferred to form a preferred white look to whites in an image. Any suitable whitening agent or pigment may be incorporated in the polyolefin layer such as, for example, titanium dioxide, zinc oxide, zinc sulfide, zirconium dioxide, white lead, lead sulfate, lead chloride, lead aluminate, lead phthalate, antimony trioxide, white bismuth, tin oxide, white manganese, white tungsten, talc and combinations thereof. The pigment is used in any form that is conveniently dispersed within the flange or resin coat layers. The preferred pigment is titanium dioxide. In addition, suitable optical brightener may be employed in the polyolefin layer including those described in Research Disclosure, Vol. No. 308, Dec. 1989, Publication 308119, Paragraph V, page 998.

In addition, it may be necessary to use various additives such as antioxidants, slip agents, or lubricants, and light stabilizers in the plastic elements as well as biocides in the paper elements. These additives are added to improve, among other things, the dispersibility of fillers and/or colorants, as well as the thermal and color stability during processing and the manufacturability and the longevity of the finished article. For example, the polyolefin coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), combinations of the above, heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate, light stabilizers such as hindered amine light stabilizers (HALS), of which a preferred example is poly{[6-[(1,1,3,3-tetramethylbutylamino}-1,3,5-triazine-4-piperidinyl)-imino]-1,6-hexanediyl[{2,2,6,6-tetramethyl-4-piperdinyl) imino]}(Chimassorb 944 LD/FL).

The elements of the invention can be made using several different manufacturing methods. The coextrusion, quenching, orienting, and heat setting of the element may be effected by any process, which is known in the art, for producing polymer sheet, such as by a flat sheet process or a bubble or tubular process. The flat sheet process involves extruding the blend through a slit die and rapidly quenching the extruded web upon a chilled casting drum so that the foam core component of the element and the polymeric integral flange components are quenched below their solidification temperature. The flange components may be extruded through a multiple stream die with the outer flange forming polymer streams not containing foaming agent. Alternatively, the surface of the foaming agent containing polymer may be cooled to prevent surface foaming and form a flange. The quenched sheet may then be oriented by stretching at a temperature above the glass transition temperature and below the melting temperature of the matrix polymers. The sheet may be stretched in one direction and then in a second direction or may be simultaneously stretched in both directions. After the sheet has been stretched, it may be heat set by heating to a temperature sufficient to crystallize or anneal the polymers while restraining, to some degree, the sheet against retraction in both directions of stretching. This step may be followed by a heat relaxation step where some of the orientation is reduced under controlled conditions.

The element, while described as having at least three layers of a foam core and a flange layer on each side, among other combination, may also be provided with additional layers that may serve to change the properties of the element. The article, preferably an imaging element, could be formed with surface layers that would provide an improved adhesion or look.

These elements may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability, coating polyvinylidene chloride for heat seal properties. Further examples include flame, plasma, or corona discharge treatment to improve printability or adhesion.

The element may also be made through the extrusion laminating process. Extrusion laminating is carried out by bringing together the paper or polymeric flange sheets of the invention and the foam core with application of an adhesive between them, followed by their being pressed in a nip such as between two rollers. The adhesive may be applied to either the flange sheets or the foam core prior to their being brought into the nip. In a preferred form, the adhesive is applied into the nip simultaneously with the flange sheets and the foam core. The adhesive may be any suitable material that does not have a harmful effect upon the element. A preferred material is polyethylene that is melted at the time it is placed into the nip between the foam core and the flange sheet. Addenda may also be added to the adhesive layer. Any know material used in the art to improve the optical performance of the system may be used. The use of $TiO_2$ is preferred. During the lamination process also, it is desirable to maintain control of the tension of the flange sheets in order to minimize curl in the resulting laminated receiver support.

Used herein, the phrase 'imaging element' comprises an imaging support as described above along with an image receiving layer as applicable to multiple techniques governing the transfer of an image onto the imaging element. Such techniques include thermal dye transfer, electrophotographic printing, or inkjet printing, as well as a support for photographic silver halide images. As used herein, the phrase "photographic element" is a material that utilizes photosensitive silver halide in the formation of images.

The thermal dye image-receiving layer of the receiving elements of the invention may comprise, for example, a polycarbonate, a-polyurethane, a polyester, polyvinyl chloride, poly(styrene-co-acrylonitrile), poly(caprolactone), or mixtures thereof. The dye image-receiving layer may be present in any amount that is effective for the intended purpose. In general, good results have been obtained at a concentration of from about 1 to about 10 $g/m^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention, provided it is transferable to the dye-receiving layer by the action of heat. Especially good results have been obtained with sublimable dyes. Dye donors applicable for use in the present invention are described, e.g., in U.S. Pat. Nos. 4,916,112, 4,927,803, and 5,023,228. As noted above, dye-donor elements are used to form a dye transfer image. Such a process comprises image-wise-heating a dye-donor element and transferring a dye image to a dye-receiving element as described above to form the dye transfer image. In a preferred embodiment of the thermal dye transfer method of printing, a dye donor element is employed which comprises a poly(ethylene terephthalate) support coated with sequential repeating areas of cyan, magenta, and yellow dye, and the dye transfer steps are sequentially performed for each color to obtain a three-color dye transfer image. When the process is only performed for a single color, then a monochrome dye transfer image is obtained.

Thermal printing heads, which can be used to transfer dye from dye-donor elements to receiving elements of the invention, are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form, the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

When used as ink jet imaging media, the recording elements or media typically comprise a substrate or a support material having on at least one surface thereof an ink-receiving or image-forming layer. If desired, in order to improve the adhesion of the ink receiving layer to the support, the surface of the support may be corona-discharge-treated prior to applying the solvent-absorbing layer to the support or, alternatively, an undercoating, such as a layer formed from a halogenated phenol or a partially hydrolyzed vinyl chloride-vinyl acetate copolymer, can be applied to the surface of the support. The ink receiving layer is preferably coated onto the support layer from water or water-alcohol solutions at a dry thickness ranging from 3 to 75 micrometers, preferably 8 to 50 micrometers.

Any known ink jet receiver layer can be used in combination with the external polyester-based barrier layer of the present invention. For example, the ink receiving layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their and derivatives, derivatives of natural polymers such as functionalized proteins, functionalized gums and starches, and cellulose ethers and their derivatives, and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers, and combinations of these materials. Hydrophilic polymers, inorganic oxide particles, and organic beads may be present in one or more layers on the substrate and in various combinations within a layer.

A porous structure may be introduced into ink receiving layers comprised of hydrophilic polymers by the addition of ceramic or hard polymeric particulates, by foaming or blowing during coating, or by inducing phase separation in the layer through introduction of non-solvent. In general, it is preferred for the base layer to be hydrophilic, but not porous. This is especially true for photographic quality prints, in which porosity may cause a loss in gloss. In particular, the ink receiving layer may consist of any hydrophilic polymer or combination of polymers with or without additives as is well known in the art.

If desired, the ink receiving layer can be overcoated with an ink-permeable, anti-tack protective layer such as, for example, a layer comprising a cellulose derivative or a cationically modified cellulose derivative or mixtures thereof. An especially preferred overcoat is poly β-1,4-anhydro-glucose-g-oxyethylene-g-(2'-hydroxypropyl)-N,N-dimethyl-N-dodecylammonium chloride. The overcoat layer is non-porous, but is ink permeable and serves to improve the optical density of the images printed on the element with water-based inks. The overcoat layer can also protect the ink receiving layer from abrasion, smudging, and water damage. In general, this overcoat layer may be present at a dry thickness of about 0.1 to about 5 μm, preferably about 0.25 to about 3 μm.

In practice, various additives may be employed in the ink receiving layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, and light stabilizers. In addition, a mordant may be added in small quantities (2%-10% by weight of the base layer) to improve waterfastness. Useful mordants are disclosed in U.S. Pat. No. 5,474,843.

The layers described above, including the ink receiving layer and the overcoat layer, may be coated by conventional coating means onto a transparent or opaque support material commonly used in this art. Coating methods may include, but are not limited to, blade coating, wound wire rod coating, slot coating, slide hopper coating, gravure, and curtain coating. Some of these methods allow for simultaneous coatings of both layers, which is preferred from a manufacturing economic perspective.

The DRL (dye receiving layer) is coated over the tie layer or TL at a thickness ranging from 0.1-10 μm, preferably 0.5-5 μm. There are many known formulations, which may be useful as dye receiving layers. The primary requirement is that the DRL is compatible with the inks, which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166, 5,264,275, 5,104,730, 4,879,166, and Japanese Patents 1,095,091, 2,276,671, 2,276,670, 4,267,180, 5,024,335, and 5,016,517 disclose aqueous based DRL formulations comprising mixtures of psuedo-bohemite and certain water soluble resins. Light in U.S. Pat. Nos. 4,903,040, 4,930,041, 5,084,338, 5,126,194, 5,126,195, and 5,147,717 discloses aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable DRL formulations based on poly(vinyl alcohol). Iqbal in U.S. Pat. No. 5,208,092 discloses water-based IRL formulations comprising vinyl copolymers, which are subsequently cross-linked. In addition to these examples, there may be other known or contemplated DRL formulations, which are consistent with the aforementioned primary and secondary requirements of the DRL, all of which fall under the spirit and scope of the current invention.

The preferred DRL is 0.1-10 micrometers thick and is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, and light stabilizers.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118, 5,027,131, and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, and humectants. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Smooth opaque paper bases are useful in combination with silver halide images because the contrast range of the silver halide image is improved, and show through of ambient light during image viewing is reduced. The preferred photographic element of this invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to 100 μ seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above. This invention in a preferred embodiment utilizes a radiation-sensitive emulsion comprised of silver halide grains (a) containing greater than 50 mole percent chloride based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula:

$$[ML_6]^n \qquad (I)$$

wherein n is zero, −1, −2, −3, or −4, M is a filled frontier orbital polyvalent metal ion, other than iridium, and $L_6$ represents bridging ligands which can be independently selected, provided that at least four of the ligands are anionic ligands, and at least one of the ligands is a cyano ligand or a ligand more electronegative than a cyano ligand, and (ii) an iridium coordination complex containing a thiazole or substituted thiazole ligand. Preferred photographic imaging layer structures are described in EP Publication 1 048 977. The photosensitive imaging layers described therein provide particularly desirable images on the base of this invention.

In another embodiment, a thermal imaging system, described in, inter alia, U.S. Pat. Nos. 4,771,032, 5,409,880, 5,410,335, 5,486,856, and 5,537,140, and sold by Fuji Photo Film Co., Ltd. under the Registered Trademark "AUTOCHROME" which does not depend upon transfer of a dye, with or without a binder or carrier, from a donor to a receiving sheet may be utilized with the present invention. The imaging element contains an imaging layer, which comprises plural heat-coloring elements, each comprising a diazo compound and a coupling component causing heat coloring. Each of the diazo compounds in the heat-coloring elements may be decomposed by radiation having a respectively different wavelength. The process uses a recording sheet having three separate superposed color-forming layers, each of which develops a different color upon heating. The top color-forming layer develops color at a lower temperature than the middle color-forming layer, which in turn develops color at a lower temperature than the bottom color-forming layer. Also, at least the top and middle color-forming layers may be deactivated by actinic radiation of a specific wavelength (the wavelength for each color-forming layer being different, but both typically being in the near ultra-violet) so that after deactivation the color-forming layer will not generate color upon heating.

This recording sheet is imaged by first imagewise heating the sheet so that color is developed in the top color-forming layer, the heating being controlled so that no color is developed in either of the other two color-forming layers. The sheet is next passed beneath a radiation source of a wavelength, which deactivates the top color-forming layer, but does not deactivate the middle color-forming layer. The sheet is then again imagewise heated by the thermal head, but with the head producing more heat than in the first pass, so that color is developed in the middle color-forming layer, and the sheet is passed beneath a radiation source of a wavelength, which deactivates the middle color-forming layer. Finally, the sheet is again imagewise heated by the thermal head, but with the head producing more heat than in the second pass, so that color is developed in the bottom color-forming layer.

Briefly, in the system, heat-responsive microcapsules containing a dye precursor, diazonium salt are controlled by heat, whereby the contact between the inclusion and a developer and an organic base compound having been prepared outside the microcapsules is controlled, or that is, the reaction between them is controlled to thereby control the dye formation resulting from the contact reaction. Next, the microcapsules are exposed to UV rays so as to decompose the dye precursor. The thus-decomposed dye precursor does not react with the coupler, and therefore gives no color. The latter stage is for color image fixation. The heat-responsive microcapsules are meant to indicate microcapsules of which the substance permeability through their walls varies under heat. For full-color imaging in the system, the heat-responsive microcapsules themselves and the diazonium salt to be therein are specifically defined. The details of the system are in *Printer Materials and Chemicals* (edited by Kyosuke Takahashi and Masahiro Irie, published by CMC, 1995).

The present invention may also be used with an imaging assembly that comprises photohardenable microencapsulated coloring agents. Development is accomplished by the application of uniform pressure to the imaging assembly. Improved performance is obtained with respect to the imaging assembly's response to pressure by employing a support meeting certain barrier properties. The imaging medium or assembly may also be referred to as a recording medium, and the imaging layer may be referred to as a recording layer, since the assembly may serve both to capture an image (either the original image or an electronic copy), as does film, and also to display the image, as does a print. Consistent with this fact, the imaging assembly may form a positive image.

The photosensitive imaging layer (including microcapsules) is colored by pressure development after exposure to radiation based on image information. The microcapsules, whose mechanical strength changes (increases) when exposed to light, are ruptured by means of pressure development, whereupon the coloring material and other substances encapsulated in the microcapsules flow out (to varying amounts based on the exposure) and development occurs. The coloring material, such as a substantially colorless color former, migrates to, and reacts with, the developer material and coloring occurs, whereupon a color image is developed.

The "rupture" of the microcapsules is not an all-or-nothing event. Rather, the microcapsules exposed to light are differentially photocured to release varying amounts of color former in order to achieve tonal depth in the exposed area. The differential exposure to light proportionately increases the viscosity of the photocurable composition and thus immobilizes the color former proportionately to the desired tonal depth in the exposed area. The rupture of the microcapsules and the release of the color former are accomplished by the uniform application of pressure. Development of the photosensitive imaging layer may be accomplished, for example, by passing the imaging assembly between a pair of upper and lower nip rollers.

In a self-contained imaging system, an imaging layer containing developer and photohardenable microcapsules may be placed between two support members to form an integral unit, wherein at least one support is transparent and at least one support exhibits a water vapor transmission rate of less than 0.77 gm/m$^2$/day (0.05 gm/100 in$^2$/day). Suitably, the transparent support has a percentage light transmission of at least 80 percent at a wavelength of 550 nm. Preferably, the barrier is also sealed on the sides to further prevent water vapor from permeating out of the imaging layer. The term "sealed," as used herein, refers to a seal, which is designed to be non-temporary. This seal is maintained during printing of the image and in the final imaged product, as compared to a temporary package.

In the imaging assembly useful with the invention, a first support is transparent and a second support may be transparent or opaque. In the latter case, an image is provided against a substantially white background as viewed through the transparent support and, in the former case, the image is viewed as a transparency preferably using an overhead or slide projector. Sometimes herein the first support may be referred to as the "front" support and the second support may be referred to as the "back" support. Foam core supports useful in this application tend to be opaque because the foaming process creates voids that are filled with a gas. The combination of polymer and air voids creates an opaque substrate.

The term "raw stock keeping" (RSK) is meant to describe the stability of the product from time of manufacture to time of use by the customer. Another metric of concern is "media shelf life" which is defined as the stability of the product from the time of opening a presealed package containing the media to the time of consumption (printing) of the media. Typically, a package may contain a plurality of media, for example 20 media.

As mentioned above, the self-contained imaging assembly comprises an imaging layer or series of layers in which a color developing material (also referred to as a color developer) reacts with a dye precursor (also referred to as a color former) inside microcapsules. Typically, the microcapsules encapsulate photohardenable compositions comprising a photosensitive initiator and hardenable material that undergoes a change of mechanical strength when irradiated with light of a predetermined wavelength, wherein the plurality of microcapsules encapsulates at least a dye precursor for coloring when brought into contact with the color developing material.

The plurality of microcapsules comprises three different types of microcapsules. The three types of microcapsules encapsulate the polymerization initiator, photocurable resin (each photocuring by irradiation with light of one of the three primary colors of light, respectively), and the colorless dye precursors for producing each of the colors of yellow, magenta and cyan. For example, when irradiating the self-contained imaging assembly with blue light (with a wavelength of 470 nm), the photocurable resin of the microcapsules containing only yellow dye precursors is photocured, and these microcapsules (yellow) differentially rupture even when pressure developing the self-contained imaging assembly, however the microcapsules which were not photocured (magenta and cyan) rupture and the magenta and cyan dye precursors are forced out from the microcapsules and react with the color developing material, whereupon coloring occurs, and these colors mix to become a blue color, whereupon this blue color may be seen through the light-transmitting support.

Further, when irradiating the self-contained imaging assembly with green light (with a wavelength of 525 nm), the photocurable resin of the microcapsules containing only magenta dye precursors is photocured, the yellow and cyan microcapsules are ruptured by pressure development, and as a result of the reaction of the color developing material with the yellow and cyan dye precursors the respective coloring occurs, whereupon these colors mix to become a green color. Moreover, when irradiating the self-contained imaging assembly with red light (with a wavelength of 650 nm), the photocurable resin of the microcapsules containing only cyan dye precursors is photocured, the yellow and magenta microcapsules are ruptured by pressure development, and as a result of the reaction of the color developing material with the yellow and magenta dye precursors the respective coloring occurs, whereupon these colors mix to become a red color.

Furthermore, when all microcapsules are photocured to maximum hardness by exposure to light corresponding to the three types of microcapsules previously mentioned, they do not rupture even by pressure development. Therefore coloring does not occur, and the surface of the opaque support may be seen through the light-transmitting support, that is the surface color (white in the present embodiment) of the opaque support becomes the background color. In short, a color image is formed only in the areas where a coloring reaction occurred when the microcapsules ruptured. This coloring principal is sometimes called "self-coloring."

The self-contained imaging assembly for use with the present invention may having a barrier layer in at least one, preferably both, of the supports. The transparent support may be from 5 to 250 μm thick, preferably 10 to 125 μm thick, and has a light transmission of at least 80% at a wavelength of 550 nm, preferably a light transmission of at least 80% at a wavelength from 450 to 800 nm, more preferably a light transmission of at least 90% at 550 nm, most preferably from 450 to 800 nm. In particular, at least one of the two supports, preferably both, have a water vapor transmission rate of less than 0.77 gm/m$^2$/day (0.05 gm/100 in$^2$/day), preferably not more than 0.47 gm/m$^2$/day (0.03 gm/100 in$^2$/day). The water vapor transmission rate is measured according to ASTM F-1249, hereby incorporated by reference. Although the vapor transmission rate is decreased by increasing thickness, increasing thickness may begin to adversely affect the transparency of the support.

By the term "barrier layer" or "barrier material" is meant a material that has a water vapor transmission rate of less than 0.77 gm/m$^2$/day (0.05 gm/100 in$^2$/day) per 25 micron thickness of the material by the ASTM F-1249 test. Since the barrier layer is part of a support, the support may have other layers that provide a higher water vapor transmission than the barrier layer, so long as the water vapor transmission rate of the entire "top" support, and preferably both supports, is less than 0.77 gm/m$^2$/day (0.05 g/100 in$^2$ day). The support comprising a barrier layer may be referred to as a "barrier support." A separable part of the barrier support containing a barrier layer may be referred to as a "barrier sheet," for example, when referring to a material commercially available for use in the present invention.

Preferably, the top transparent support contains at least one layer that is a barrier material. This barrier material may desirably have a preselected combination of properties, including thickness (if too thick, too hazy, if too thin not sufficient support) and optical properties. The barrier material may desirably be highly transparent, colorless, practical and cost effective, manufacturable or commercially available, able to be applied via coating or lamination, and stable (non-yellowing). This combination of properties is difficult to find in a single material. Many materials previously used in forming barriers in packaging do not meet all the necessary criteria alone or at all, for example, nylon, PC, PET, polyolefins, and saran polymers. The latter materials do not provide sufficient barrier properties unless using thick layers that are impractical in the present invention. Some materials, while having good moisture barrier properties, have an unacceptable tint, for example silicon oxide coated polyester films. Some materials with exceptional moisture barrier properties are not transparent, for example, aluminum metallised film or paper.

Thus, one embodiment for use with the present invention is directed to a self-contained photohardenable imaging assembly packaged for commercial sale wherein the assembly comprises, in order, a first transparent support that is 5 to 250 μm in thickness and has a light transmission of at least 80% at a wavelength of 550 μm and a water vapor transmission rate of less than 0.77 g/m2/day (0.05 g/100 in 2 day), one or more imaging layers comprising a plurality of microcapsules encapsulating a photohardenable composition and a color precursor which may react with a developing material in the same or an adjacent imaging layer, and a second support which may be opaque or transparent that is 5 to 250 μm thick.

In a preferred embodiment for use with the invention, the assembly is sealed and the assembly is preconditioned to maintain the imaging layers at a relative humidity greater within the range of from 40 to 90%. The assembly may be sealed by means of heat or other means.

In yet another embodiment for use with the present invention, a self-contained photohardenable imaging assembly further comprises an intermediate layer comprising a relatively resilient material (compared to first transparent support), wherein the Young's modulus of the resilient material is 0.02 to 10 ksi. This has been found beneficial for better distributing the pressure applied to the microcapsules during development.

Materials which may be used as a barrier sheet for a transparent support include, but are not limited to, fluorinated polymers, ceramic coated polymers, for example aluminum oxide, indium tin oxide, or silicon nitride coated on polyester or other transparent polymeric substrates, and other sheet materials meeting the above limitations. Especially preferred are $Al_2O_3$ vacuum deposited coatings on a polyester film (for example, Toppan® GL-AE, available from Toppan Printing Co.) and chlorotrifluoroethylene homopolymer and copolymer films (for example, ACLAR® films available from Honeywell Corp.).

It is preferred that a barrier layer is on both sides of the imaging layer in order to maintain the relative humidity within the assembly. In one embodiment, the relative humidity within the assembly, and particularly within the at least one imaging layer, is maintained at greater than 40%, preferably greater than 50%, by sealing the front and back supports on the sides, after the imaging layer has equilibrated to the desired relative humidity.

Adhesive materials useful for adhering the support to the emulsion or imaging layer may be selected from the general class of "modified acrylics" that have good adhesion, which may be formulated with improved "tack" by addition of tackifying resins or other chemical additives. A useful adhesive may desirably be designed for high initial adhesion and for adhesion to plastic substrates like polyester. It may desirably have the ability to flow quickly for laminating to porous material (the imaging layer) and yet be inert with respect to the imaging layer. High strength adhesives useful in this invention, for example, are the film label stock adhesives of the 3M Company, including 3M's #300 and #310 adhesive formulas which exhibit "inertness" to the imaging layer. Other examples of adhesives useful in this invention are aqueous-based adhesives such as Aeroset® 2177 or Aeroset® 2550, 3240, and 3250 which are commercially available from Ashland Chemical Co., PD 0681, AP 6903, and W 3320 available from H. B. Fuller, or solvent-based pressure sensitive adhesives such as PS 508 sold by Ashland Chemical Co.

The adhesives may be used separately or in combination. Preferably, the adhesive is transparent or translucent and most preferably it is a transparent adhesive which remains transparent even after subjecting the assembly to actinic radiation and pressure necessary to image-wise expose and rupture the microcapsules. The amount of the adhesive will vary depending on the nature of the adhesive and the support. The adhesive is generally applied in an amount of from 0.5 to 20 g/m2.

A subbing layer for promoting adhesion between the transparent support and the imaging layer may desirably have good compatibility with the imaging layer, may desirably not effect the sensitometric response of the imaging layer, and may desirably be chemically stable. Amorphous polyesters, which may be applied as an aqueous dispersion, have been found to work well as the subbing layer material. Polymers with molecular weights of 5,000-15,000, with a low hydroxyl number and low acid number, may be employed, for example, the AQ polymers from Eastman Chemical Co. and, more particularly, AQ38 and AQ55. The subbing layer is coated onto the support at a dried coating weight of from 0.1 to 5.0 g/m 2, with a preferred dried coating weight of from 0.5 to 2.0 g/m2.

Preferably the subbing layer also includes an ultraviolet (UV) ray absorber. Many types of UV absorbing materials have been described in the prior art, including U.S. Pat. Nos. 3,215,530, 3,707,375, 3,705,805, 3,352,681, 3,278,448, 3,253,921, 3,738,837, 4,045,229, 4,790,959, 4,853,471, 4,865,957, and 4,752,298, 5,977,219, 5,538,840 and United Kingdom Pat. No. 1,338,265. Most preferred UV absorbers are polymeric UV absorbers prepared by the method described in U.S. Pat. Nos. 4,496,650, 4,431,726, 4,464,462 and 4,645,735, 5,620,838, EP 0 190 003, U.S. Pat. Nos. 3,761, 272, 3,813,255, 4,431,726, 4,455,368, and 4,645,735.

Suitable photohardenable compositions, photoinitiators, chromogenic materials, carrier oils and encapsulation techniques for the layer of microcapsules are disclosed in U.S. Pat. Nos. 4,440,846, 4,772,541, and 5,230,982. Although the latter photohardenable compositions are non-silver systems, silver-based photohardenable microencapsulated system such as that described in U.S. Pat. Nos. 4,912,011, 5,091,280 and 5,118,590 and other patents assigned to Fuji Photo Film Co are also suitable for use in the present invention.

In accordance with the preferred embodiments useful with the invention, a full color imaging system is provided in which the microcapsules are sensitive to red, green, and blue light, respectively. The photohardenable composition in at least one and preferably all three sets of microcapsules may be sensitized by a cationic dye-borate anion complex, e. g., a cyanine dye/borate complex as described in U.S. Pat. No. 4,772,541. For optimum color balance, the microcapsules are sensitive (lambda max) at 450 nm, 540 nm, and 650 nm, respectively. Such a system is useful with visible light sources in direct transmission or reflection imaging. Such a material is useful in making contact prints or projected prints of color photographic slides. They are also useful in electronic imaging using lasers, light emitting diodes, liquid crystal displays or pencil light sources of appropriate wavelengths.

Because cationic dye-borate anion complexes absorb at wavelengths greater than 400 nm, they are colored. The unreacted dye complex present in the microcapsules in the low density image areas may cause undesired coloration in the background area of the final picture, for example, the mixture of microcapsules tends to be green which may give the low density image areas a slight greenish tint. Approaches to reducing undesired coloration in the low density image area as well as the developed image include reducing the amount of photoinitiator used, adjusting the relative amounts of cyan, magenta and yellow microcapsules, or providing a compensating tint in the white opaque support.

The photohardenable compositions used in the microcapsules may also contain a disulfide coinitiator. Examples of useful disulfides are described in U.S. Pat. No. 5,230,982. By means of the optional use of such disulfides, the amount of the photoinitiators used in the microcapsules may be reduced to levels such that the background coloration or residual stain is less than 0.3 and preferably less than 0.25 density units.

The photohardenable compositions of the present invention may be encapsulated in various wall formers using conventional techniques, including coacervation, interfacial polymerization, polymerization of one or more monomers in an oil, as well as various melting, dispersing, and cooling methods. To achieve maximum sensitivities, it is important that an encapsulation technique be used that provides high quality capsules which are responsive to changes in the internal phase viscosity in terms of their ability to rupture. Because the borate tends to be acid sensitive, encapsulation procedures conducted at higher pH (for example, greater than 6) are preferred. Melamine-formaldehyde capsules are particularly useful. U.S. Pat. No. 4,962,010 discloses a conventional encapsulation useful in the present invention in which the microcapsules are formed in the presence of pectin and sulfonated polystyrene as system modifiers. A capsule size may be selected which minimizes light attenuation. The mean diameter of the capsules used in this invention typically ranges from approximately 1 to 25 μm. As a general rule, image resolution improves as the capsule size decreases. Technically, however, the capsules may range in size from one or more microns up to the point where they become visible to the human eye.

The developer materials employed in carbonless paper technology are useful in the present invention. Illustrative examples are clay minerals such as acid clay, active clay, attapulgite, organic acids such as tannic acid, gallic acid, propyl gallate, acid polymers such as phenol-formaldehyde resins, phenol acetylene condensation resins, condensates between an organic carboxylic acid having at least one hydroxy group and formaldehyde, metal salts of aromatic carboxylic acids or derivatives thereof such as zinc salicylate, tin salicylate, zinc 2-hydroxy naphthoate, zinc 3,5 di-tert butyl salicylate, zinc 3,5-di-(a-methylbenzyl)salicylate, oil soluble metals salts or phenol-formaldehyde novolak resins (for example, see U.S. Pat. Nos. 3,672,935 and 3,732,120) such as zinc modified oil soluble phenol-formaldehyde resin as disclosed in U.S. Pat. No. 3,732,120, zinc carbonate and mixtures thereof. The particle size of the developer material may affect the quality of the image. In one embodiment, the developer particles are selected to be in the range of from 0.2 to 3 μm, preferably in the range of from 0.5 to 1.5 μm. One or more suitable binders selected from polyethylene oxide, polyvinyl alcohol, polyacrylamide, acrylic lattices, neoprene emulsions, polystyrene emulsions, and nitrile emulsions, may be mixed with the developer and the microcapsules, typically in an amount of from 1 to 8% by weight, to prepare a coating composition. A preferred developer material is one, which provides good compatibility with the microcapsule slurry solution, for example Schenectady International resin HRJ-4250 solution.

The self-contained imaging assembly used as photosensitive recording medium is not limited to the embodiments that have been described before, but different variations or modifications thereof are possible. For example, instead of encapsulating the photocurable resin and the polymerization initiator inside the microcapsules of the self-contained imaging assembly, the photocurable resin and the polymerization initiator may also be included in the material constituting the microcapsules. Further, instead of photocurable microcapsules, the self-contained imaging assembly may contain photo-softening microcapsules, for example, microcapsules which have sufficient strength in the unexposed state, and which soften when exposed to light of a predetermined wavelength. In this case it is desirable to perform thermal curing by heat fixing.

There is no need to use red, green and blue light to capture the image in the imaging layer, depending on the characteristics of the photosensitive recording medium, light with various wavelengths may be selected. For example, light emitting elements producing infrared light, red, and green, or light emitting elements producing far infrared light, near infrared light, and red may also be selected. Ultraviolet and far ultraviolet are also advantageous examples of valid color choices for light emitting elements. Moreover, the number of colors of the light emitting elements is not limited to the three colors red, green, and blue, it is equally possible to use only one or two colors, or to select four colors, as in a typical color printer using yellow, magenta, cyan, and black, or even more colors. Furthermore, the choice of light emitting elements includes, but is not limited to LEDs, electroluminescent lamps (EL), light emitting plasma and laser devices, and other light emitting elements.

The imaging assembly of the present invention may be exposed in any suitable camera or other exposure device to provide an image. The imaging assembly of this invention is especially suitable for exposure using a liquid crystal array or light emitting diodes driven by a computer generated signal or a video signal for the reproduction of images from a video cassette recorder, or a camcorder. It is possible to utilize, for example, with the current state of technology, a very economical compact printer, weighing under 500 g and having a size less than 100,000 mm3 that prints directly from a digital camera utilizing a CompactFlash® card interface and provides a resolution of 150 ppi or more with continuous tone and over 250 gradation levels.

The print is "developed," based on the "latent image" formed by the selectively photohardened microencapsulated color formers, by the application of pressure or by the application of both heat and pressure. See, for example, the image forming device described in U.S. Pat. No. 5, 884,114 to Iwasaki, in which a photo and pressure sensitive printer provides the feeding and discharging of a photosensitive imaging medium at the front of the printer housing, which device may have the added advantage of being easily integrated into other equipment such as a personal computer. In this particular device, the latent image is formed by a movement in the main scanning direction of an LED-type exposure head. Thereafter, an upper nip roller of a developing mechanism is moved from a separated position to a pressing position. The capsules that have not been photohardened are ruptured by pressure and a full color image is formed on the sheet, heat-fixing (which is optional to the present invention) is performed by a film heater, and the imaged assembly is discharged from the front of the housing for the device or printer.

A typical pressure-type image-forming device (which may be referred to as a printer) typically comprises a printer housing with a lightproof cartridge for accommodating photosensitive imaging media (alternately referred to as recording media) mounted to the front of the printer housing so as to be easily detachable. In some devices, a preheater is employed for preheating the photosensitive imaging medium. A typical exposure mechanism may include an exposure head for exposing while scanning in a direction perpendicular to the surface of the drawing and a developing mechanism for pressure development by means of a pair of an upper and a lower nip roller. The roller may be maintained under pressure by a spring. An optional fixing heater for heat-fixing the developed photosensitive imaging medium may be used. A discharge tray may be provided at the rear end of the printer housing. The pressure sensitive printer may be designed so that sheets are both fed and discharged at the front side of the printer housing.

An image forming device for treatment of the imaging media may, for example, comprise exposure means for forming a latent image on the imaging medium upon exposure based on image information, developing means for developing the latent image by means of the coloring material coming out of the microcapsules when pressure is applied to the photosensitive imaging medium on which the latent image was formed by the exposure means, wherein the developing means comprise a pair of an upper and a lower nip roller facing each other and sandwiching the transport path of the photosensitive imaging medium, pressing means for pressing one nip roller against the other nip roller, roller switching means for alternately switching between a pressing position in which the one nip roller is brought into pressure contact with the other nip roller and a separated position in which the one nip roller is separated from the other nip roller, and a transport path for transporting the photosensitive imaging medium comprises a feed path for feeding the photosensitive imaging medium on the inlet side, a discharge path for discharging the recorded photosensitive imaging medium.

In one embodiment, the developing mechanism may comprise a pair of an upper and a lower nip roller, a rectangular frame fixed inside the printer housing for supporting the nip rollers, a pair of compression springs for pressing both ends of the roller axis of the upper nip roller toward the lower nip roller, and a roller switching mechanism for alternately switching between a pressing position in which the upper nip roller is brought into pressure contact with the lower nip roller and a separated position in which it is separated from the lower nip roller. If the pressing force of each of the springs is 150 kgf, the upper nip roller presses with a total force of 300 kgf on the lower nip roller. However, other means for applying pressure may be employed, for example, a pressure stylus.

A control unit for the image-forming device may comprise a CPU, a ROM and a RAM, an I/O interface, and drive circuits, wherein a stepping motor for paper transport, a solenoid actuator for driving a switching plate, a film heater, a motor for roller switching, a stepping motor for driving the carriage, the exposure head, are respectively connected to the drive circuits. A connector and a control panel may also be connected to the control unit. In one embodiment, image data (RGB image data) from an external host computer may be fed via a connector to the control unit.

The ROM may store control programs for controlling all operations of the printer, a control program for calculating, from the input image data, the duration for which each LED of the exposure head is turned on and the timing thereof, a control program for controlling the transport of the self-contained imaging assembly by controlling the stepping motor for sheet transport synchronously with the exposure to green, red and blue light, a control program for controlling the scanning of the exposure head by controlling the stepping motor for driving the carriage synchronously with the exposure to green, red and blue light. The different buffers and memory types necessary for running the control programs are in the RAM. The number of copies to be printed, the enlargement or reduction ratio of the image, the size of the image forming area of the imaging assembly, input by an operator at the control panel, may be stored in the memory of the RAM. Exposure may take place upon calculation of the driving conditions for the stepping motor.

In one type of image-forming device, when image data of an image is sent to the control unit, the image data is divided into R image data, G image data, and B image data and stored in a buffer of the RAM. Each LED of an exposure heat may be electrically driven by a drive circuit via a cable.

In one embodiment of practicing the invention, imaging medium sheets may be packaged as a stack of sheets, which go into the printer. The individual sheets may be picked from the stack of sheets and transported into the "printing path" of the printer. However, if two or more sheets at the same time are picked up and fed into the printing path the printer, the printer may become jammed, requiring disassembly by the user. To avoid this problem, the static in the sheets may be reduced or eliminated just prior to the final packaging, and a precision hinge on the printer film cassette or tray may be used. Also, a method to further aid the feeding of sheets into the printer is to add a "back coat" or backing layer to the imaging medium. In general, these coatings may include a binder and a grit or abrasive such as silica. Preferably, the front side of the first support and the back side of the second support has a coefficient of friction of less than 0.4.

The article, preferably an imaging element, of the invention may comprise a single layer or multiple layers according to need. The antistatic layer of the invention may be placed in any location in the article, preferably an imaging element, providing the layer is able to remain conductive. In one embodiment, the antistatic layer may be on the same side of support as imaging layer. In another embodiment, the antistatic layer may be on the side of support opposite the imaging layer. In another embodiment, the antistatic layer may be on top of the imaging layer, that is, one the side of the imaging layer opposite the support or between the imaging layer and the support. There may also be more than one antistatic layer. These multiple layers may be in any combination of the above locations.

The multiplicity of other layers present in the article, preferably an imaging element, may include any number of auxiliary layers such as antistatic layers, backmark retention layers, tie layers or adhesion promoting layers, abrasion resistant layers, conveyance layers, barrier layers, splice providing layers, UV absorption layers, antihalation layers, optical effect providing layers, waterproofing layers, flavor retaining layers, fragrance providing layers, adhesive layers, and imaging layers.

The article, preferably an imaging element, of the invention may be subjected to any number of coatings and treatments, after extrusion, coextrusion, and orientation, or between casting and full orientation, to improve its properties, such as printability, barrier properties, heat-sealability, spliceability, adhesion to other supports and/or imaging layers. Examples of such coatings can be acrylic coatings for printability, and polyvinylidene halide for heat seal properties. Examples of such treatments can be flame, plasma and corona discharge treatment, to improve printability and adhesion. Further examples of treatments can be calendaring, embossing, and patterning to obtain specific effects on the surface of the element. The element of the invention may be incorporated in any other suitable support by lamination, extrusion coating, or any other method known in the art.

The following examples illustrate the practice of this invention. They are not intended to be exhaustive of all possible variations of the invention. Parts and percentages are by weight unless otherwise indicated.

EXAMPLES

The following examples illustrate the practice of this invention. They are not intended to be exhaustive of all possible variations of the invention. Parts and percentages are by weight unless otherwise indicated.

The samples created by this invention were characterized for caliper (thickness), density, surface roughness and stiffness. Stiffness was measured using a Lorentzen and Wetter (L&W) type tester according to Tappi Method T556. The bending resistance in milliNewtons (mN) of a 20 mm wide vertically clamped sample was measured for a 15° deflection angle. Surface roughness of the roll surfaces was measured using a Mahr Perthometer M2 with a skidded, 2 μm radius diamond probe. The polymeric sheet or film surface roughness was measured using both a Mahr Concept 5000, with an unskidded 2 μm diamond probe, and using a Zygo New View 5000 interferometric microscope.

Example 1

Control Foam Core

In this example, polypropylene foam of caliper 231.14 μm and density 0.54 gm/cm$^3$ was obtained from a commercial source. This was then extrusion resin coated on both sides using a flat sheet die. The upper flange, on the face or imaging layer side of the foam, was coextrusion coated with two layers. The layer closer to the foam was coated at 12 gm/m$^2$ coverage, at a melt temperature of 274° C., and comprised approximately 10% anatase $TiO_2$, 20% Mistron CB Talc (from Luzenac America), 20% PA609 (amorphous organic polymer from Exxon Mobil) and 50% PF611 (polypropylene homopolymer—extrusion coating grade from Basell). The skin layer, that is, the layer furthest from the foam, was coated at 12 gm/m$^2$ coverage, at a melt temperature of 300 C, and comprised approximately 18% $TiO_2$, 4.5% ZnO, and 78.5% D4002 P (low density polyethylene from Eastman Chemical Company). The lower flange on the wire side of the foam was monoextrusion coated at 300 C melt temperature. The lower flange coating was at 28 gm/m² coverage and comprised approximately 10% anatase TiO₂, 20% Mistron CB Talc, 20% PA609 and 50% PF611. The melt extruded polypropylene was extruded from a coat hanger flat sheet die. The polymer was extruded into a nip formed by a chill roller and a pressure roller with the polypropylene foam core sheet being the primary web substrate that was against the pressure roller and the molten polypropylene flange against the chill roller surface.

Example 2

Smooth Foam Element of Invention

Example 2 was a foamed polypropylene sheet with a basis weight of 574.5 gm/m² and an average sheet caliper of 758.7 μm in which there was a near instantaneous control of the polymer's surface diffusion rate of the image layer side of the cast polymer sheet and then followed by bulk heat transfer on the balance of the sheet. This instantaneous control was accomplished by controlling the dimensionless time (t*) spent by the extrudate prior to its coming into contact with the high heat transfer surface. For this Example, the t* was approximately 0.013. The foam core sheet was made with a 90 weight %, of a low melt strength linear polypropylene from Huntsman corporation (P4G4Z-011) with a melt flow rate of 12 gms. polymer extruded/10 min. and 7.5 weight % of high melt strength polypropylene (Dow D114.01) with a melt flow rate of 0.42 gms. polymer extruded/10 min. The overall melt strength of the resin blend is less than 10 cN at 200° C. An endothermic chemical blowing agent concentrate CT1636, which has 20% active blowing agent and is a diluted version of RBN40, was obtained from Clariant Corporation, and was added to the above polymer blend ratio at approximately 0.5 weight percent of active blowing agent. The blend was extruded on a 0.063 m single screw extruder. A coat hanger die was used. The resin was extruded at a melt temperature of 204° C. onto a cooling configuration which consisted of a small high heat transfer surface maintained at 21° C. and a larger (0.686 m) diameter heat transfer roller that was run at a temperature of approx 71.1° C. The cast polymer sheet was stripped from the large roller surface and then stretched (stretch ratio is 6×) in the machine direction by a series of heated sequentially driven rollers. Stretching served to accentuate the roughness of surfaces by enlarging or at least elongating the surface features. There were 14 heated rolls all together whose temperatures and speeds could be varied. The core sample was then melt extruded with an upper and low flange as describe in sample 1.

Example 3

Foam Core Without Gradient—Longer Distance from Die to High Heat Transfer Surface Example 3 was a foamed polypropylene sheet using the same material composition as example 2. The only difference was that quenching was done with the high heat transfer surface approximately 2.5 times further away from the die slot exit than that used to make example 2. The basis weight of the cast sheet sample was 577.31 gm/m² and average sheet caliper was 771.65 μm. This cast sample was then oriented uniaxially using a stretch ratio of 6 using the same conditions as example 2. The core sample was then melt extruded with an upper and low flange as describe in sample 1.

Example 4

No High Heat Transfer Surface Between Die and Casting Roller

This example was the same as Example 2 except the foamed polypropylene sheet was extruded directly onto the casting wheel without the high heat transfer surface. The basis weight of the cast sheet sample was 573.49 gm/m² and average sheet caliper was 1015.49 μm. This cast sample was then oriented uniaxially using a stretch ratio of 6× using the same conditions as example 2. The resultant foam core sample was then melt extruded with an upper and low flange as describe in sample 1.

Example 5

High Temperature on High Heat Transfer Surface

Example 5 was made the same as example 2 except the high heat transfer surface was maintained at 32° C. The basis weight of the cast sheet sample was 571.94 gm/m² and average sheet caliper was 762.76 μm. This cast sample was then oriented uniaxially using a stretch ratio of 6× using the same conditions as example 2. The resultant foam core sample was then melt extruded with an upper and low flange as describe in sample 1.

TABLE 1

| # | Sample Description | $R_a$ of Cast Sheet (μm) | Stretched 6 times (Stretch ratio) in machine direction $R_a$ (μm) | Surface Appearance (Visual assessment) | Flange Sheet Roughness Appearance |
|---|---|---|---|---|---|
| 1 | Commercial Foam (Control) | Information not available | 3.5* | Matte appearing/ Has lines and striations | Rough with Many pits |
| 2 | Polypropylene foam (Invention) | 0.209 | 0.78 | High gloss/ smooth | Smooth/ No Pits |
| 3 | Polypropylene foam (Increased distance to high heat transfer surface) | 0.373 | 1.38 | Low gloss/ Liney | Slightly rough Some pits |
| 4 | Polypropylene foam (no high heat transfer surface) | Too rough to measure | To rough to measure | Corrugated | Wavey/rough with pits |
| 5 | Polypropylene foam (heat transfer surface at higher temperature) | 0.247 | 0.916 | Medium gloss with some haze/ Slightly rougher than sample 2 | Slightly rough |

*Actual stretch ratio is not known

As can be seen from Table 1, example 1 (control foam) is a commercially available foam core that is low in stiffness, in spite of a relative thick core, and is very rough and liney. It should be noted that even when coated with thick flange layers, the surface was still rough and had numerous pits and craters. Example 2 is a cast, foamed polypropylene sheet representing one embodiment of this invention in which the surface of the sheet, prior to stretching, provides a smooth surface. The improved smoothness of the cast core is preserved, even with the addition of flange layers. Since the core layer starts smooth, less flange coverage is required to obtain the desired smoothness and stiffness of the final sheet. By way of contrast, example 3 was made with a longer distance from the die to the heat transfer surface. This translated to a larger $t^*$. More pits were observed and the surface started to become liney. Example 4 was made without a high heat transfer surface as used in example 2 and the surface became rougher and wavey and more pits were observed. Example 5 was made with a heat transfer surface at a temperature 11° C. higher than Example 2. As noted in the observations the surface started to become rougher. As noted in the cast sheet roughness column, the higher temperatures resulted in roughness that was approximately 20% higher than sample 2. That is, the less cooling applied to the polymer at the point of foaming, the rougher the surface, that is, less control of foaming produces a rougher surface.

Example 6

Multiple Foam Layers

This example is made using a coextrusion process in which a three-layer foam polypropylene sheet is cast. The materials are the same as described in example 2 except the center layer contains a higher level of chemical blowing agent than the two foamed layers on each side of it. During the pressure reduction as the melt polymer exits the die, there is more foam in the center layer than two outer layers, thereby forming a differential density. To further enhance this example one surface is near instantaneously controlled for surface diffusion rate on one side followed by bulk heat transfer on the balance of the sheet. The sheet is then stretched in the machine direction in a similar manner as described in example 5. The core sample is then melt extruded with an upper and low flange as describe in sample 1.

Example 7

Uniaxially Oriented Foam

Example 7 was a foamed polypropylene sheet manufactured with near instantaneous control of the polymer's surface diffusion rate of the image layer side of the cast polymer sheet and then followed by bulk heat transfer on the balance of the sheet. The dimensionless time ($t^*$) spent by the extrudate prior to it coming into contact with the high heat transfer surface was 0.008. The foam core sheet was made with a 90 weight %, of a low melt strength linear polypropylene from Huntsman corporation (P4G4Z-011) with a melt flow rate of 12 gms. polymer extruded/10 min. and 7.5 weight % of high melt strength polypropylene (Dow D114.01) with a melt flow rate of 0.42. An endothermic chemical blowing agent concentrate CT1636 (has 20% active blowing agent, it is a diluted version of RBN40) was obtained from Clariant Corporation, and was added to the above polymer blend at approximately 0.5 weight percent of active blowing agent. The blend was extruded on a 2.5 inch single screw extruder at an output rate of 240 lbs/hr. A coat hanger die was used. The resin was extruded at an melt temperature of approximately 204.4° C. onto a small high heat transfer medium then conveyed into a nip with a larger (0.686 m) diameter heat transfer roller that was run at a temperature of approx 71.1° C. The cast polymer sheet was stripped from the large roller surface and then stretched in the machine direction by a series of heated sequentially driven rollers. There were 14 heated rolls all together whose temperatures, speeds, and relative distances from each other could be varied. Rolls 1-2 were maintained at 121.1° C., rolls 3-6 were maintained at 132.2° C., rolls 7-10 were maintained at 148.9° C., rolls 11-14 were maintained at 93.3° C. and the stretch ratio (amount of uniaxial stretching or machine direction orientation) was 7. The stretching was carried out between roll 6 and roll 7. Roll 6 position was at 0.20828 m measured from its reference position. Roll 7 position was at 0.18288 m measured from its reference position Example 8

Uniaxially Oriented Foam

Example 8 was a foamed polypropylene sheet made from the same chemical composition as that of Example 7. The cast sheet was made similar to that in Example 7. The cast sheet was then stretched in the 14 heated roll section. Rolls 1-2 were maintained at 121.1° C., rolls 3-6 were maintained at 132.2° C., rolls 7-10 were maintained at 148.9° C., rolls 11-14 were maintained at 93.3° C. and the machine direction stretch ratio was 5. The stretching was carried out between roll 6 and roll 7. Roll 6 position was at 0.20828 m measured from its reference position. Roll 7 position was at 0.18288 m measured from its reference position.

Example 9

Uniaxially Oriented Foam

Example 9 was a foamed polypropylene sheet made from the same chemical composition as that of Example 7. The cast sheet was made similar to that in Example 7 except that the output rate of the extruder was decreased to 200 lbs/hr. The cast sheet was then stretched in the 14 heated roll section. Rolls 1-2 were maintained at 121.1° C., rolls 3-6 were maintained at 132.2° C., rolls 7-10 were maintained at 140.6° C., rolls 11-14 were maintained at 93.3° C. and the machine direction stretch ratio was 5. The stretching was carried out between roll 6 and roll 7. Roll 6 position was at 0.20828 m measured from its reference position. Roll 7 position was at 0.18288 m measured from its reference position.

Example 10

Uniaxially Oriented Foam

Example 10 was a foamed polypropylene sheet made from the same chemical composition as that of Example 7. The cast sheet was made similar to that in Example 7 except that the output rate of the extruder was decreased to 240 lbs/hr. The cast sheet was then stretched in the 14 heated roll section. Rolls 1-2 were maintained at 121.1° C., rolls 3-6 were maintained at 132.2° C., rolls 7-10 were maintained at 140.6° C., rolls 11-14 were maintained at 93.3° C. and the machine direction stretch ratio was 5. The stretching was carried out between roll 6 and roll 7. Roll 6 position was at 0.20828 m measured from its reference position. Roll 7 position was at 0.08128 m measured from its reference position.

TABLE 2

| Sample Description | Caliper μm | Apparent Density gms/cc | L&W Stiffness MD (mN) | L&W Stiffness CD (mN) |
|---|---|---|---|---|
| Commercial Foam #1 | 179.83 | 0.55 | 46.3 | 12.5 |
| Example 7 | 172.21 | 0.54 | 57.3 | 13.0 |
| Commercial Foam #2 | 212.09 | 0.52 | 51.2 | 17.3 |
| Example 8 | 198.63 | 0.52 | 99.7 | 18.7 |
| Commercial Foam #3 | 230.89 | 0.54 | 76.7 | 30.3 |
| Example 9 | 230.12 | 0.54 | 92.2 | 35.0 |
| Commercial Foam #4 | 272.8 | 0.53 | 114.5 | 52.7 |
| Example 10 | 266.45 | 0.54 | 140.2 | 70.7 |
| Commercial Foam #5 | 304.04 | 0.51 | 137.8 | 66.5 |

MD: Machine Direction
CD: Cross machine Direction

As noted by the data in Table 2, the stiffness of the commercially available foams are lower in MD and CD stiffness than the embodiments of this invention. This is true, even though the caliper (thickness) of the commercial foams are higher in all cases at the same density. Thus, contrary to conventional teachings, thinner supports of the present invention produce stiffnesses equivalent or greater than thicker conventional supports. Stiffer foams are preferred because they have a substantial feel to them and appear to be less flimsy. In imaging elements and in synthetic papers, this is an important attribute because it conveys the perception of higher value.

Table 2 compares the caliper (thickness), densities and stiffness as measured by an L&W stiffness tester of commercially available polypropylene foams to samples generated in Example 7-10. For nearly equivalent densities, and at equivalent thickness or thicknesses lesser than commercial foams, the samples generated by the present invention are stiffer. In other words, the ratio of stiffness to weight of samples for the foams created using this invention are better than that for commercial foams. Thus, the sheet structure created in the cast sheet persists after uniaxial stretching leading to enhancement in stiffness.

The invention claimed is:

1. An article comprising a base wherein said base comprises a closed cell foam core sheet, wherein said closed cell foam core sheet comprises at least one closed cell foam layer, wherein said at least one closed cell foam layer comprises a polymer that has been expanded through the use of a blowing agent, and wherein said closed cell foam layer has a density wherein said density comprises a gradient, and wherein said article further comprises at least one imaging layer applied thereto.

2. The article of claim 1 wherein said closed cell foam core sheet comprises a solid polymer matrix, and a gaseous phase.

3. The article of claim 1 wherein said polymer comprises polyolefin.

4. The article of claim 1 wherein said polymer comprises polypropylene, its derivatives and copolymers.

5. The article of claim 1 wherein said polymer comprises blends of polyolefin.

6. The article of claim 1 wherein said polymer comprises polyester.

7. The article of claim 1 wherein said polymer comprises a melt flow rate of from 0.3 to 30 gms. of polymer/10 min.

8. The article of claim 1 wherein said polymer comprises a melt flow rate of 0.3 to 20 gms. of polymer/10 min.

9. The article of claim 1 wherein said polymer comprises a melt flow rate of 0.3 to 15 gms. of polymer/10 min.

10. The article of claim 1 wherein said closed cell foam core sheet has a center and at least one surface, and wherein said density gradient increases from said center to said surface.

11. The article of claim 1 wherein said closed cell foam core sheet has a center and at least one surface, and wherein said density gradient decreases from said center to said surface.

12. The article of claim 1 wherein said closed cell foam core sheet has at least one surface wherein said surface has a surface roughness average of greater than 1.4 μm 13. The article of claim 1 wherein said closed cell foam core sheet is oriented in at least one direction.

14. The article of claim 13 wherein said article has a surface roughness ($R_a$) of less than 0.4 μm prior to said orienting.

15. The article of claim 13 wherein said closed cell foam core sheet has at least one surface wherein said surface has a surface roughness average of less than 2.0 μm.

16. The article of claim 1 wherein said closed cell foam core sheet is cast.

17. The article of claim 1 wherein said foam core sheet has a thickness of from 25 to 1000 μm.

18. The article of claim 1 wherein said foam core sheet has a thickness of from 25 to 250 μm.

19. The article of claim 1 wherein said imaging layer comprises at least one photosensitive silver halide layer.

20. The article of claim 1 wherein said imaging layer comprises an ink jet receiving layer.

21. The article of claim 1 wherein said imaging layer comprises a thermal dye receiving layer.

22. The article of claim 1 wherein said imaging layer comprises an electrophotographic imaging layer.

23. The article of claim 1 wherein said imaging layer comprises a crushable dye encapsulated imaging layer.

24. The article of claim 1 wherein said base has opacity greater than 90%.

25. The article of claim 1 wherein said base has a thickness of from 100 to 400 μm.

26. The article of claim 1 wherein said base has a b* UVO blueness of less than 3.50.

27. The article of claim 1 wherein said base has a L* of from 90.0 to 97.0.

28. The article of claim 1 further comprising at least one flange layer adhered to said closed cell foam core sheet.

29. The article of claim 28 wherein said flange layer is formed integrally with said foam core sheet.

30. The article of claim 28 wherein said flange layer comprises polymer.

31. The article of claim 30 wherein said polymer comprises at least one member selected from the group consisting of high density polyethylene, polypropylene, or polystyrene, their blends or their copolymers.

32. The article of claim 30 wherein said polymer comprises polyolefin polymer.

33. The article of claim 30 wherein said flange layer comprises oriented polyolefin sheets.

34. The article of claim 33 wherein said oriented polyolefin layer is biaxially oriented.

35. The article of claim 28 wherein said flange layer comprises paper.

36. The article of claim 28 wherein said flange layer comprises fabric.

37. The article of claim 28 wherein said at least one flange layer comprises an upper and lower flange sheet.

38. The article of claim 28 further comprising a whitening agent.

39. The article of claim 38 wherein said whitening agent comprises at least one inorganic compound.

40. The article of claim 38 wherein said inorganic compound is selected from the group consisting of $TiO_2$, $CaCO_3$, clay, and talc.

41. The article of claim 38 wherein said whitening agent is located in the flange layer.

42. The article of claim 38 wherein said whitening agent is in said foam core sheet.

43. The article of claim 28 further comprising an optical brightener.

44. The article of claim 28 further comprising a tinting agent.

45. The article of claim 28 further comprising polyethylene resin coatings on each side of said base.

* * * * *